United States Patent [19]
Kimura

[11] Patent Number: 5,910,938
[45] Date of Patent: Jun. 8, 1999

[54] LIGHT SIGNAL DETECTION CIRCUIT

[75] Inventor: Motoi Kimura, Kanagawa, Japan

[73] Assignee: Sony Corporation, Japan

[21] Appl. No.: 09/022,547

[22] Filed: Feb. 12, 1998

Related U.S. Application Data

[62] Division of application No. 09/704,721, filed as application No. PCT/JP96/00190, Jan. 31, 1996, Pat. No. 5,805,558.

[30] Foreign Application Priority Data

Jan. 31, 1995 [JP] Japan .................................. P7-014691
Jan. 31, 1995 [JP] Japan .................................. P7-014692

[51] Int. Cl.⁶ ...................................................... G11B 7/00
[52] U.S. Cl. ............................................. 369/116; 369/124
[58] Field of Search ................................. 369/13, 54, 58, 369/99, 100, 112, 116, 120, 124

[56] References Cited

U.S. PATENT DOCUMENTS 5,136,569  8/1992  Fennema et al. .................... 369/116 X
5,202,875  4/1993  Rosen et al. ........................ 369/112 X

*Primary Examiner*—Paul W. Huber
*Attorney, Agent, or Firm*—Rader, Fishman & Grauer; Ronald P. Kananen

[57] ABSTRACT

An output current from the anode side of one photo-diode PD1 of two photo-diodes PD1, PD2 and an output current from the cathode side of the other photo-diode PD2 which serves as an in-phase signal with respect to the first mentioned output current are added in terms of current to convert an added current thus obtained into a voltage signal by a current/voltage converter 1. Thus, circuit such as summing amplifier, etc. can be omitted and this light signal detection circuit is only required to have one circuit/voltage converter 1. As a result, noise at the time of reproduction of a magneto-optical signal can be reduced while holding the circuit scale down to small size. Thus, S/N ratio of the reproduction signal is improved, thus, making it possible to improve, e.g., the error rate in the digital system to much degree. Accordingly, improvements, in reliability /information desity/transmission rate(speed) can be made.

5 Claims, 19 Drawing Sheets

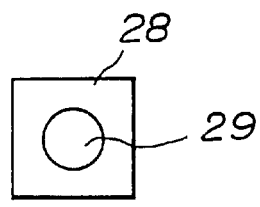
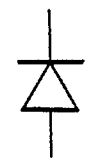
FIG.14(a)      FIG.14(b)
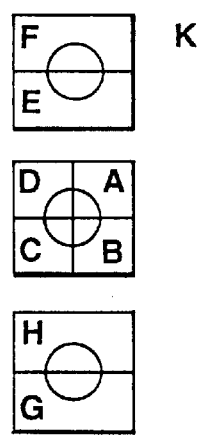
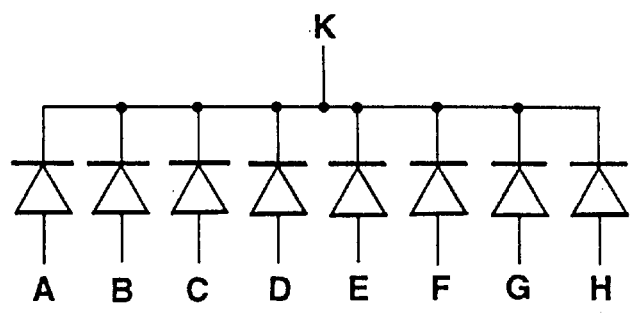
FIG.15(a)      FIG.15(b)

_5,910,938_

LIGHT SIGNAL DETECTION CIRCUIT

This application is a divisional of application Ser. No. 08/704,721, filed Nov. 4, 1996, now U.S. Pat. No. 5,805,558, which is a 371 of PCT/JP96/00190, filed Jan. 31, 1996.

DESCRIPTION

TECHNICAL FIELD

This invention relates to a light signal detection circuit for optically reproducing signals recorded on an optical recording medium which takes disc shape or tape shape, etc., and more particularly to a light signal detection circuit preferable when applied to reproduction of signals recorded on a magneto-optical disc magneto-optically recorded, or an optical disc recorded by phase pits or change of reflection factor.

BACKGROUND ART

Initially, the optical disc for the magneto-optical disc will be described below.

In the magneto-optical disc, recording signals are recorded by perpendicularly magnetizing the magnetic film in an upper direction or in a lower direction in accordance with recording signals. Reproduction of the magneto-optical disc is carried out by irradiating linearly polarized laser beams onto the disc. With respect to a reflected light of linearly polarized laser beams irradiated onto the magneto-optical disc, its plane of polarization is rotated in dependency upon the fact that the direction of magnetization is changed upwardly or downwardly by the so-called Kerr effect. In the optical system for the magneto-optical disc, change (fluctuation) of the plane of polarization of reflected light is converted into change of light intensity by light detection element, e.g., polarization beam splitter, etc. Photo-detector detects such change of the light intensity as light current.

For the photo-detector, photo-diode, e.g., PIN photo-diode or avalanche photo-diode, etc. is used. By allowing this light current to be passed through current/voltage converter, reproduction signal is obtained.

Explanation will be given in more practical sense. Since a reflected light from the magneto-optical disc is such that since quantity of rotation of the plane of polarization is extremely small, common mode (in-phase) noise component is canceled so that S/N ratio can be improved. The reflected light from the magneto-optical disc is caused to undergo rotation of the plane of polarization, e.g., by half wave plate thereafter to convert change of plane of polarization into light intensity modulated two light beams which are opposite to each other in phase through a light detection element. Changes of light intensity of these light beams are respectively detected by photo-detectors to obtain a magneto-optical reproduction signal by differential component (difference).

A more practical example of a conventional circuit configuration for such a magneto-optical signal reproduction will be described with reference to FIG. 1.

Two light beams which have been intensity-modulated in the state opposite to each other in phase are incident to photo-diodes 80, 81 shown in FIG. 1. As a result, electron (positive) hole pairs are produced in proportion to incident light quantity so that current is caused to flow. Thus, two current signals modulated in the state opposite to each other in phase are respectively taken out from the anode sides (or the cathode sides). In taking out detection output currents from these photo-diodes 80, 81, in order to improve the response speed or the linearity, inverse biases are respectively applied to the terminals to reduce capacity between electrodes.

Output currents from the photo-diodes 80, 81 are respectively passed through capacitors 82, 83 so that DC component is eliminated, and are then converted into voltage signals by current/voltage converters 84, 85. The current/voltage converters 84, 85 respectively output voltage signals of phases opposite to each other to the inverting terminal (−) and the non-inverting terminal (+) of a differential amplifier 86. The differential amplifier 86 removes common mode (in-phase) noise component of the delivered signal to take out a differential (difference) component to thereby obtain a reproduction signal.

The detection technology for light signal by the differential detection system will now be described as the related technology.

Initially, FIG. 2 shows a conventional single detection system, and this system is a method of taking out electron/(positive) hole pairs produced by incident light to photo-diode 80 from one end of the photo-diode 80, i.e., either one of the anode and the cathode. Accordingly, this method only takes out one of electron hole pairs.

On the contrary, in accordance with the differential detection system, as shown in FIG. 3, for example, output currents of phases opposite to each other corresponding to incident light are taken out from the anode side and the cathode side of the photo-diode 80. The output currents of phases opposite to each other are respectively delivered to current/voltage converters 89, 90 through capacitors 87, 88. Thus, the current/voltage converters 89, 90 provide voltage signals of phases opposite to each other. Respective voltage signals of phases opposite to each other are delivered to a differential amplifier 91. The differential amplifier 91 takes out a differential component to thereby obtain a reproduction signal. Signal quantity at this time becomes equal to a value twice greater than the signal quantity by the conventional single detection system.

In this case, although there are used two current/voltage converters 89, 90 of which number is twice greater than that of the single detection system, since noise produced in the current/voltage converter is random noise, noise generated from the current/voltage converter in a final output signal of the circuit of FIG. 3 becomes equal to a value of $\sqrt{2}$ times. As a result, the noise level of the current/voltage converter with respect to the signal level can be reduced to $1/\sqrt{2}$.

An example of a magneto-optical signal detection circuit to which such a differential detection system is applied is shown in FIG. 4. The circuit of FIG. 4 is constituted by using two circuits of the differential detection system of FIG. 3, and reference numerals of corresponding portions of FIG. 3 with primes a, b are respectively attached to the portions of these two circuits of the differential detection system, and their explanation will be omitted.

In FIG. 4, output signals from differential amplifiers 91a, 91b are delivered to a differential amplifier 92, thereby making it possible to reduce the noise level of the current/voltage converter with respect to the signal level to $1/\sqrt{2}$.

Meanwhile, in such conventional magneto-optical signal detection circuit, since reflected light from the magneto-optical disc is very weak, noises that the current/voltage converters 89a, 89b, 90a, 90b generate are applied to a reproduction signal. For example, in such a digital signal reproducing apparatus to obtain a reproduction signal from the magneto-optical disc as stated above, error rate is deteriorated (lowered) by application (superposition) of noise onto the reproduction signal.

In recent years, studies of realization of short wavelength of the light source for irradiation onto the optical disc are energetically carried out with a view to realization of high density of the optical disc. However, the photo-diode for detecting reflected light from the optical disc has a tendency such that the light receiving sensitivity of the photo-diode lowers with shortening of wavelength. As a result, the influence of noise of the current/voltage converter has been a pressing or urgent problem.

Moreover, in accordance with the circuit of FIG. 4, the noise level of the current/voltage converter with respect to the signal level can be reduced to $1/\sqrt{2}$, but two current/voltage converters and two differential amplifiers are increased as compared to the circuit configuration shown in FIG. 3, resulting in large circuit scale. Enlargement of the circuit scale leads to increase in the power consumption and cost of the circuit.

A circuit for taking out differential component between detection signals from respective light receiving elements 80, 81 as shown in FIG. 3 is adapted to take out a magneto-optical signal from a reflected light from the magneto-optical disc. On the contrary, there is the technology for taking out light signals from the optical disc recorded by phase pits or reflection factor change.

The recording by phase pits mentioned here is the system of forming uneven phase pits on the optical disc in accordance with information to carry out recording. This recording system is employed in the reproduction only type optical disc or the write once type optical disc, etc. Moreover, in recording by reflection factor change, the physical state of the recording layer onto which laser beams are irradiated is caused to be changed, e.g., from the amorphous state to crystalloid, etc. so that recording of information is carried out. The reproducing unit carries out reading of information in dependency upon difference of quantity of reflected light of laser beams which has reflected the state change of the optical disc corresponding to presence or absence of recording of information. This recording system is employed in the write once type or rewritable type optical disc, etc.

In the reproduction of the optical disc of the recording system by phase pits or reflection factor change, as apparent from the feature of the system, light signals which have been caused to undergo light intensity modulation in the in-phase state are incident to two photo-diodes. In view of this, an adder 95 is provided as shown in FIG. 5 to carry out reproduction of in-phase light signal by adding output signals from current/voltage converters 84, 85. Namely, from respective anode sides (or respective cathode sides) of the photo-diodes 80, 81, current outputs which are both in phase are obtained. These current outputs are converted into voltage signals at current/voltage converters 84, 85 to send them to the adder 95. At this time, no signal appears on the output terminal of the differential amplifier 86.

Also in the conventional magneto-optical recording/reproducing apparatus, in order to, e.g., realize reproduction of address information, etc. recorded by phase pits in advance on the magneto-optical disc, or compatible reproduction of the reproduction only disc recorded by phase pits, there are employed many configurations in which not only the differential amplifier 86 but also the adder 95 are provided.

Meanwhile, when attempt is made to realize both the magneto-optical signal detection and detection of signal recorded by phase pits or reflection factor change, differential amplifier 86 and adder 95 are required as shown in FIG. 5, resulting in the problem that the circuit configuration becomes complicated.

In addition, in order to realize high density of the optical disc, also in the case of attaining reduction of noise of the current/voltage converter by the above-described current addition system, it is expected to realize, by simple circuit configuration, not only reproduction of the magneto-optical signal but also reproduction of signal recorded by phase pits or reflection factor change.

This invention has been made in view of actual circumstances as described above, and its object is to provide a light signal detection circuit which can prevent the influence of noise even when the optical disc is caused to have high density while suppressing the circuit scale so that it becomes small, and which can reproduce information without depending upon the kind of the optical disc.

DISCLOSURE OF THE INVENTION

A light signal detection circuit according to this invention is adapted to optically detect a recording signal recorded on a recording medium by two light detecting means to add, in terms of current, an output signal from one terminal side of the one light detector or detecting means in these light detectors means and an output signal from the terminal side of the other light detector means which outputs an in-phase component with respect to the output signal to convert it into a voltage signal by current/voltage converting means.

Moreover, a light signal detection circuit according to this invention is adapted to optically detect a signal recorded on a recording medium by two light detector or detecting means to add, in terms of current, an output signal from one terminal side of one light detector means in these light detector means and an output signal from the terminal side of the other light detector means which outputs an in-phase component with respect to the output signal to convert it into voltage by first current/voltage converting means, and to add, in terms of current, an output signal from the other terminal side of the one light detector means and an output signal from the terminal side of the other light detector means which outputs an in-phase component with respect to the output signal to convert it into voltage by second current/voltage converting means to carry out differential amplification between output signals from the first and second current/voltage converting means.

In this case, it is preferable that magneto-optical recording medium is used as the recording medium, first and second photo-diodes are used as the light detecting means, the first current/voltage converting means converts a current obtained by adding, in terms of current, an output current from the anode side of the first photo-diode and an output current from the cathode side of the second photo-diode into voltage, and the second current/voltage converting means converts a current obtained by adding, in terms of current, an output current from the cathode side of the first photo-diode and an output current from the anode side of the second photo-diode into voltage.

In more practical sense, incident light signals of phases opposite to each other are received by first and second photo-diodes to take out an output signal from the anode side of the first photo-diode and an output signal from the side of second photo-diode which outputs an in-phase component, i.e., an output signal from the cathode side to add in-phase components of output signals from these two photo-diodes to convert it into a voltage signal by a first current/voltage converter, and to take out an output signal from the cathode side of the first photo-diode and an output signal from the side of the second photo-diode which outputs an in-phase component, i.e., an output signal from the anode side to add in-phase components of output signals from these two photo-diodes to convert it into a voltage signal by a second current/voltage converter to carry out differential amplification between output signals of the first and second current/voltage converters by a differential amplifier to thereby hold noise by the two current/voltage converters down to unity with respect to signal levels of two times as compared to the conventional magneto-optical detection circuit, thus making it possible to improve S/N ratio by 6 dB.

Moreover, a light signal detecting circuit according to this invention is adapted to optically detect recording a signal recorded on a recording medium by two light detecting means to convert a current obtained by adding an output current from the anode side of one light detecting means and an output current from the other light detecting means into a voltage signal by first current/voltage converting means, and to convert a current obtained by adding an output signal from the cathode side of the one light detecting means and an output current from the other light detecting means into a voltage signal by second current/voltage converting means to deliver the output signal from the cathode side of the other light detecting means to switched one of the first current/voltage converting means and the second current/voltage converting means by first switching means, and to deliver the output signal from the anode side of the other light detecting means to switched one of the first current/voltage converting means and the second current/voltage converting means by second switching means, thus to carry out differential amplification between output signals from the first and second current/voltage converting means.

In accordance with such a configuration, compatible reproduction of the optical disc which is not dependent upon kind of magneto-optical disc or optical disc for carrying out recording by phase pits or reflection factor change, etc. can be made. Thus, the degree of freedom of the format of the optical disc can be improved, and the added value of the device can be further improved.

BRIEF DESCRIPTION OF THE DRAWINGS

FIGS. 14($a$) and 14($b$) are views showing pattern of light receiving elements 24, 26 used in the optical pick-up of FIG. 13 and the equivalent circuit thereof.

FIGS. 15($a$) and 15($b$) are views showing pattern of light receiving element 20 used in the optical pick-up of FIG. 13 and the equivalent circuit thereof.

BEST MODE FOR CARRYING OUT THE INVENTION

Several preferred embodiments of a light signal detection circuit according to this invention will be described below with reference to the attached drawings. In these embodiments, photo-diode is used as light detecting means or photo-detector.

Figure 6:
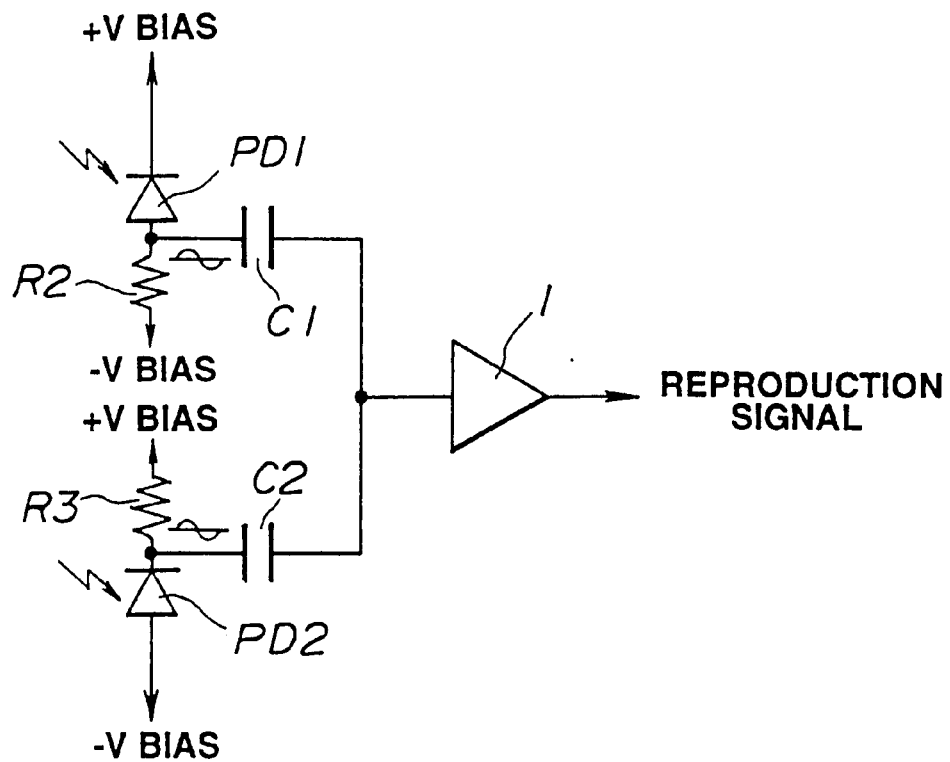
FIG. 6 is a circuit diagram showing a magneto-optical signal detection circuit which is the embodiment of a light signal detection circuit according to this invention.

FIG. 6 shows a magneto-optical signal detection circuit which is the first embodiment of this invention. The magneto-optical signal detection circuit shown in FIG. 6 is composed of two photo-diodes PD1, PD2 for detecting light signal, and a current/voltage converter 1 for adding, in terms of current, output signals from these photo-diodes PD1, PD2 to convert it into voltage.

Bias voltage of +V of positive in polarity is applied to the cathode side of the photo-diode PD1. Moreover, bias voltage of −V of negative in polarity is applied to the anode side of the photo-diode PD1 through a resistor R2.

Similarly, bias voltage of +V of positive in polarity is applied to the cathode side of the photo-diode PD2 through a resistor R3. Moreover, bias voltage of −V of negative in polarity is applied to the anode side of the photo-diode PD1.

In this magneto-optical signal detection circuit, an output from the anode side which is one terminal of one photo-diode PD1 in two photo-diodes PD1, PD2 and an output from the cathode side which is the terminal of the other photo-diode PD2 which outputs an in-phase component with respect to the output signal are caused to be respectively output currents in which d.c. component is eliminated through capacitors C1, C2 to add, in terms of current, these output currents to deliver it to the current/voltage converter 1. The reason why such a connection is employed is that since input impedance at the input terminal of the current/voltage converter 1 is low, current addition can be made by directly connecting (applying) output currents caused to be respectively passed through capacitors C1, C2.

Figure 7A:
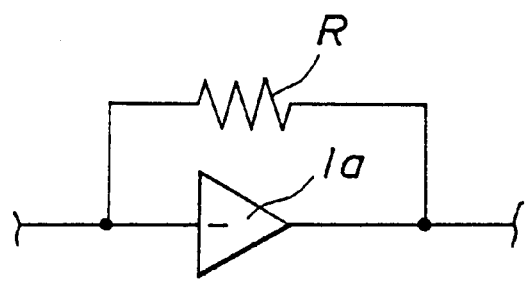
FIGS. 7($a$) and 7($b$) are views showing an actual example of a current/voltage converter in the magneto-optical signal detection circuit.
Figure 7B:
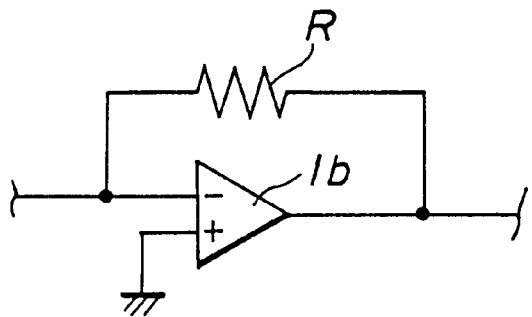

In this case, the current/voltage converter 1 may be constituted, e.g., by a negative feedback amplifier 1a of the inverting input type and a negative feedback resistor R as shown in FIG. 7(a), or by a differential amplifier 1b and a negative feedback resistor R as shown in FIG. 7(b).

In accordance with the magneto-optical signal detection circuit having the configuration shown in FIG. 6, a current signal having amplitude equal to that of the conventional magneto-optical signal detection circuit is inputted to the current/voltage converter 1 by synthesis of respective current signals as described above. Moreover, since this signal detection circuit is only required to have one current/voltage converter, level of noise produced of the current/voltage converter 1 can be held down to $1/\sqrt{2}$ as compared to the conventional magneto-optical signal detection circuit. Thus, the S/N ratio can be improved by 3 dB. As a result, respective ones of the current/voltage converter and the differential amplifier become unnecessary. Accordingly, the circuit scale can become compact.

Figure 8:
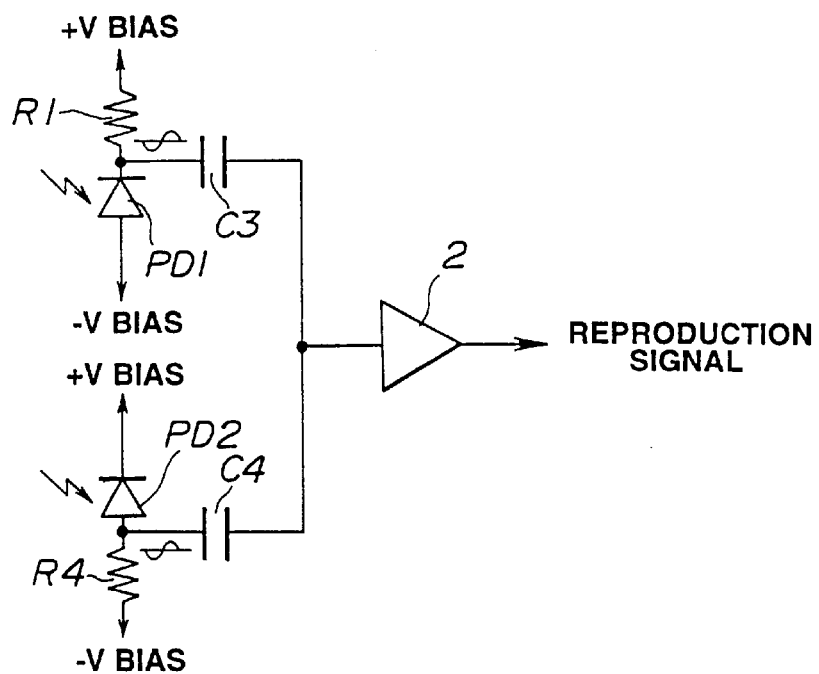
FIG. 8 is a circuit diagram showing a modification of the magneto-optical signal detection circuit.

Moreover, in the magneto-optical signal detection circuit, even if, as shown in FIG. 8, for example, there is employed a configuration to allow an output from the cathode side serving as one terminal of one photo-diode PD1 in two photo-diodes PD1, PD2 and an output from the anode side serving as the terminal of the other photo-diode PD2 which outputs a component in phase with the output signal to be respectively output currents from which d.c. component is removed through capacitors C3, C4 to add, in terms of current, these output currents to deliver it to a current/voltage converter 2, a current signal having amplitude equal to that of the conventional magneto-optical signal detecting circuit is inputted to the current/voltage converter 2 by synthesis of respective current signals.

By employing such a configuration, noise by the current/voltage converter is reduced to $1/\sqrt{2}$ as compared to the conventional magneto-optical signal detection circuit. As a result, S/N ratio can be improved by 3 dB. Thus, the circuit scale can be also reduced.

Figure 4:
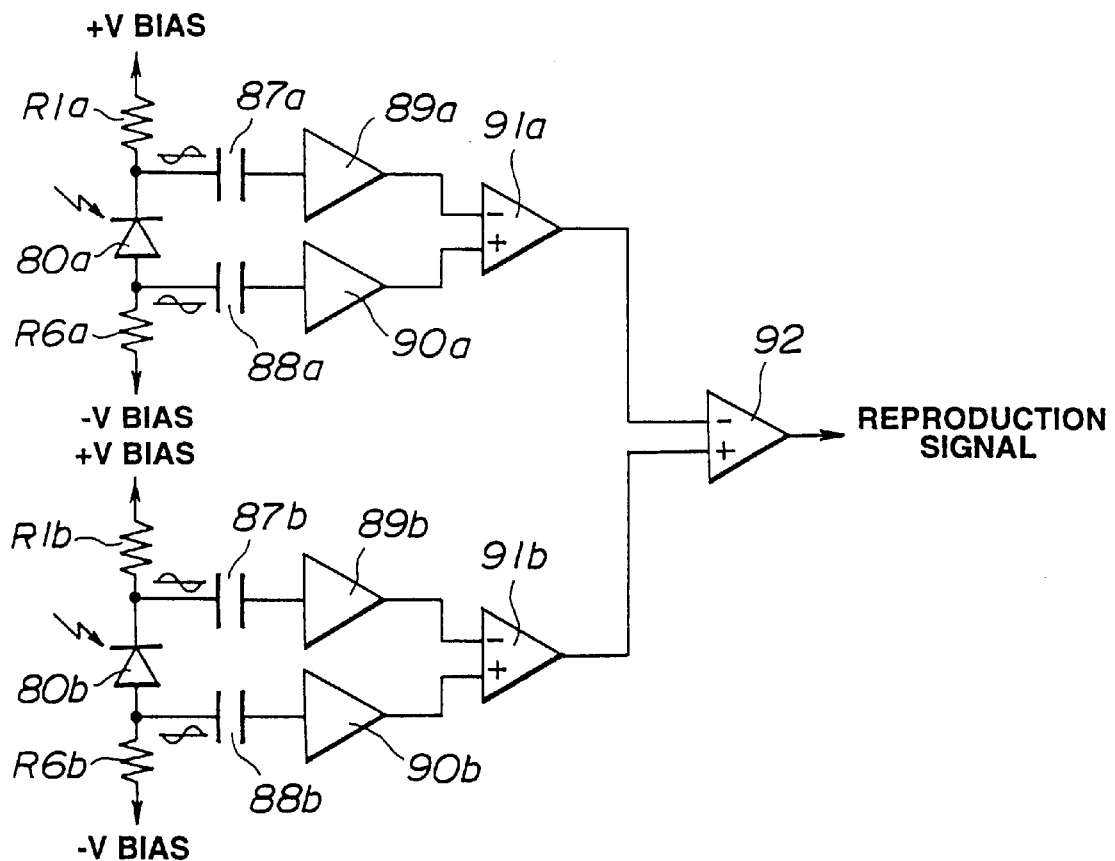
FIG. 4 is a view showing circuit configuration by the conventional magneto-optical signal differential detection system.

In accordance with this configuration, reduction of the circuit scale corresponding to three current/voltage converters and three differential amplifiers can be made as compared to the circuit configuration for detecting, in a differential manner, magneto-optical signals shown in FIG. 4.

Figure 9:
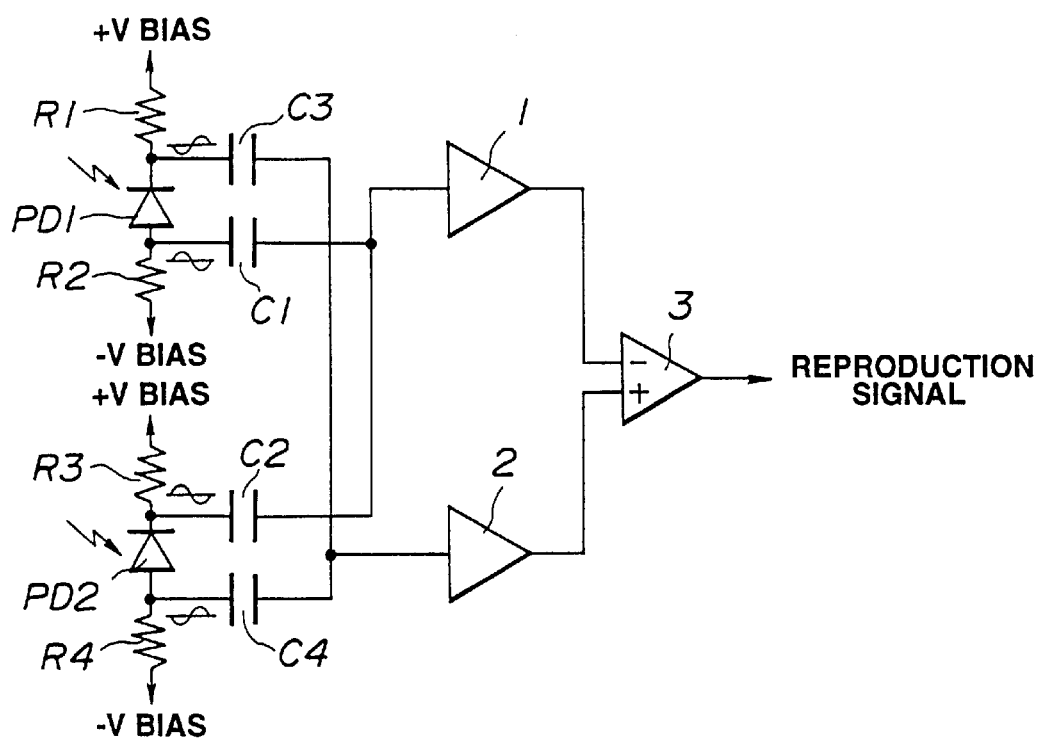
FIG. 9 is a view showing the circuit configuration in which phase relationship of signal that the magneto-optical signal detection circuit outputs is taken into consideration.

In these magneto-optical signal detection circuits shown in FIGS. 6 and 8, phases of respective output signals from current/voltage converters 1, 2 are opposite to each other. By drawing attention to this, as shown in FIG. 9, a magneto-optical signal detection circuit may be constituted so as to include two current/voltage converters 1, 2 and a differential amplifier 3 for carrying out differential amplification between respective outputs from the current/voltage converters 1, 2 delivered to the terminal side in which phase of output is taken into consideration. Here, the same reference numerals are respectively attached to common portions and their explanations will be omitted.

Output signals which are in phase from the anode of photo-diode PD1 and the cathode of photo-diode PD2 are delivered to current/voltage converter 1 through capacitors C1, C2. Moreover, output signals from the cathode of the photo-diode PD1 and the anode of the photo-diode PD2 are delivered to current/voltage converter 2 through capacitors C3, C4.

The current/voltage converters 1, 2 are respectively supplied with current signals having double amplitude by current addition of signals which are in phase. Since phases of signals that these current/voltage converters 1, 2 output have the relationship opposite to each other in phase, when, e.g., output of the current/voltage converter 2 is taken as reference, the differential amplifier 3 is supplied at the non-inverting terminal side with an output from the current/voltage converter 2, and is supplied at the inverting terminal side with an output from the current/voltage converter 1. The differential amplifier 3 outputs an output signal as an in-phase reproduction signal of amplitude twice greater than that in FIG. 6 or FIG. 8.

In this case, since the number of current/voltage converters is the same as that in the case of the conventional magneto-optical signal detection circuit, level of noise by the current/voltage converter is not changed. Accordingly, noise of the current/voltage converter with respect to the reproduction signal becomes one half (½). Accordingly, the S/N ratio with respect to the reproduction signal can be improved by 6 dB.

When such a configuration is employed, the circuit scale corresponding to two current/voltage converters and two differential amplifiers can be reduced as compared to the circuit configuration of a conventional magneto-optical signal detection circuit as shown in FIG. 4.

By employing such a configuration, it is possible to reduce the circuit scale while suppressing noise of the current/voltage converter. The S/N ratio of the reproduction signal is improved by reduction of noise of the current/voltage converter. As a result, it is possible to improve, to much degree, error rate in the digital system, for example. Thus, the improvements in the reliability/information density/transmission rate (speed) can be improved.

Moreover, such an optical path design to decrease quantity of light incident to the light receiving element thus to enhance light path efficiency from the laser light emitting element to the magneto-optical disc surface is carried out, thereby holding the emission power of the laser light emitting element down to lower level. Thus, the long life time of the system can be realized. By reduction of the circuit scale, reduction of power consumption can be made.

FIG. 10 shows an example of a light signal detection circuit for reproducing a signal which has been subjected to magneto-optical recording as described above and a signal recorded by phase pits or reflection factor change.

The light signal detection circuit shown in FIG. 10 is of a structure in which there is provided a switch SW for carrying out ON/OFF operation of output current obtained through capacitor C2 from the cathode of the other photo-diode PD2 of the magneto-optical signal detection circuit of FIG. 6.

Namely, the light signal detection circuit of FIG. 10 includes two photo-diodes PD1, PD2 for detecting light signal, a selector (changeover) switch SW disposed between the photo-diode PD2 and current/voltage converter 1, and current/voltage converter 1 for adding, in terms of current, output signals delivered from photo-diode PD1 and photo-diode PD2 through the selector switch SW to convert it into voltage.

As the current/voltage converter 1, a converter of the above-described configuration shown in FIG. 7(a) or FIG. 7(b) may be used. Since other components are similar to those of the FIG. 6 mentioned above, the same reference numerals are respectively attached to corresponding portions and their explanation is omitted.

Figure 10A:
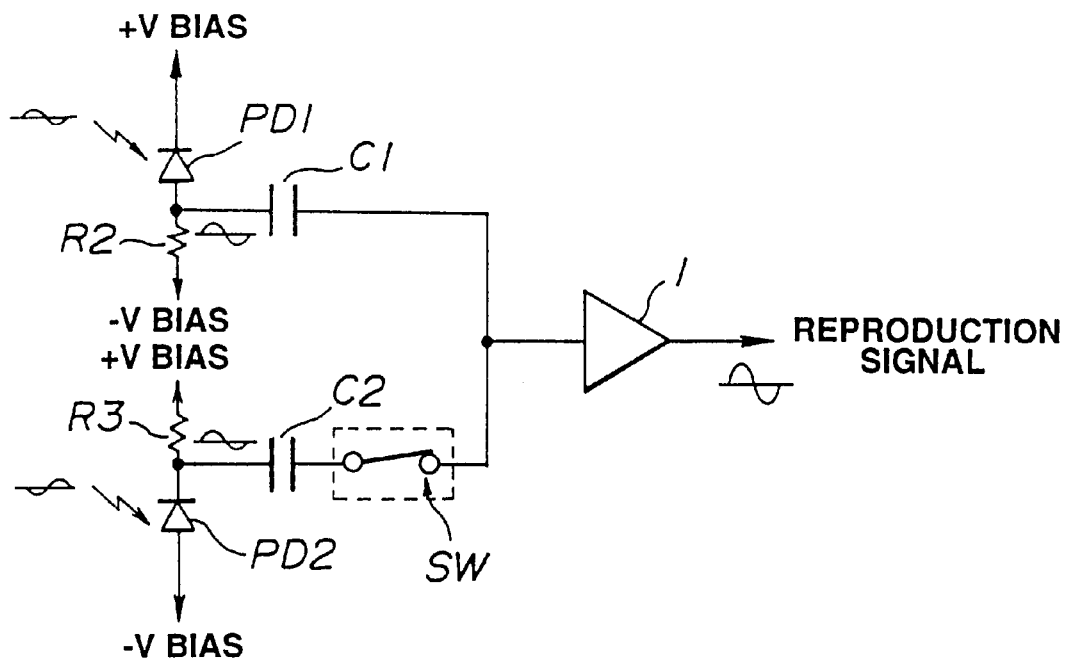
FIGS. 10($a$) and 10($b$) are views showing an example of a circuit in which the configuration for carrying out light signal detection of in-phase/anti-phase is added to the magneto-optical signal detection circuit shown in FIG. 6.
Figure 10B:
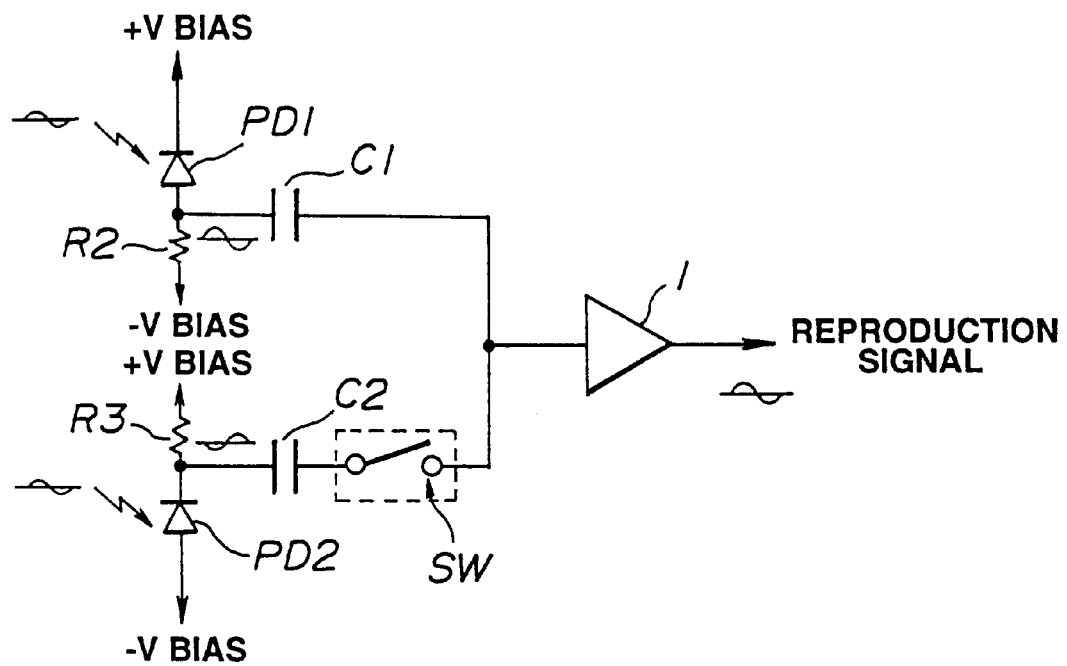

FIG. 10(a) shows the case where an anti-phase light signal from magneto-optical disc, etc. is delivered, and FIG. 10(b) shows the case where an in-phase light signal from the optical disc recorded by phase pits or reflection factor change is delivered.

At the time of reproduction of the magneto-optical signal, light signals intensity-modulated which are opposite to each other in phase are incident to respective photo-diodes PD1, PD2 as shown in FIG. 10(a). Thus, an output current from the anode side of the photo-diode PD1 and an output current from the cathode side of the photo-diode PD2 are outputted in the state where they are in phase with each other.

When the switch SW is placed in conductive state, i.e., closed state in the state where signals from the photo-diodes PD1, PD2 are in phase with each other as stated above, signals from which d.c. component is removed are delivered to the current/voltage converter 1 through capacitors C1, C2 in the state where they are added in terms of current. The reason why such connection is employed is that since input impedance at the input terminal of the current/voltage converter 1 is low, outputs caused to be respectively through capacitors C1, C2 are directly connected (applied) to thereby permit current addition.

Accordingly, the current/voltage converter 1 outputs, as reproduction signal, a voltage signal corresponding to a signal which is twice greater than those of signals obtained from the photo-diodes PD1, PD2.

Since this light signal detection circuit is only required to provide the current/voltage converter 1, the current/voltage converter 1 can hold level of noise produced down to $1/\sqrt{2}$ to reduce it as the conventional magneto-optical signal detection circuit. Since current signal having amplitude equal to that of the conventional magneto-optical signal detection circuit is inputted to the current/voltage converter 1 by synthesis of respective current signals as stated above, the S/N ratio can be improved by 3 dB. Since respective ones of the current/voltage converter and the differential amplifier become unnecessary as compared to the conventional circuit configuration, the circuit scale can be reduced.

In the case where optical disc, etc. on which recording by phase pits or reflection factor change has been made is reproduced, light signal is incident by the phase relationship shown in FIG. 10(b). Thus, an output current from the anode side of the photo-diode PD1 and an output current from the cathode side of the photo-diode PD2 are outputted in the state where they are opposite to each other in phase.

When the switch SW is placed in conductive state in the state where signals obtained from photo-diodes PD1, PD2 are opposite to each other in phase, those signals are canceled so that they disappear. In order to avoid this, the selector switch SW is turned OFF, i.e., placed in closed state to cut off signal from the photo-diode PD2. Accordingly, only signal from which d.c. component has been eliminated is delivered to the current/voltage converter 1 through the capacitor C1.

Since cancellation of currents which are opposite to each other in phase is eliminated in this way, even if light signals which are in phase with each other are incident to the photo-diodes PD1, PD2, it is possible to carry out light detection. This light detection signal has an amplitude which is one half of the amplitude of the reproduction signal of FIG. 10(a).

It is to be noted that the switch SW may be provided at the photo-diode PD1 side. In addition, there may be provided a switch for carrying out ON/OFF operation of an output current from either one of the photo-diodes PD1, PD2 of the magneto-optical detection circuit of FIG. 8.

A light signal detection circuit adapted so that selector (changeover) switches SW1, SW2 are provided in the magneto-optical signal detection circuit of FIG. 9 to reproduce magneto-optical signal and signal recorded by phase pits or reflection factor change will now be described with reference to FIG. 11. The light signal detection circuit shown in FIG. 11 can output reproduction signal of the same signal level irrespective of the phase relationship of a light signal incident thereto.

In FIG. 11, in addition to the configuration of the magneto-optical detection circuit of FIG. 9, there are provided selector (changeover) switch SW1 for delivering an output current of the cathode side of the other photo-diode PD2 to switched one of current/voltage converter 1 and current/voltage converter 2, and selector (changeover) switch SW2 for delivering an output current of the anode side of the photo-diode PD2 to switched one of the current/voltage converter 1 and the current/voltage converter 2. Namely, selected terminal 1a of the selector switch SW1 connected to the capacitor C2 of the cathode side of the photo-diode PD2 is connected to the current/voltage converter 1, and selected terminal 1b of the selector switch SW1 is connected to the current/voltage converter 2. Moreover, selected terminal 2a of selector switch SW2 connected to capacitor C4 of the anode side of photo-diode PD2 is connected to the current/voltage converter 2, and selected terminal 2b of the selector switch SW2 is connected to the current/voltage converter 1. Since other components are similar to those of FIG. 9, the same reference numerals are respectively attached to corresponding portions, and their explanation will be omitted.

Figure 11A:
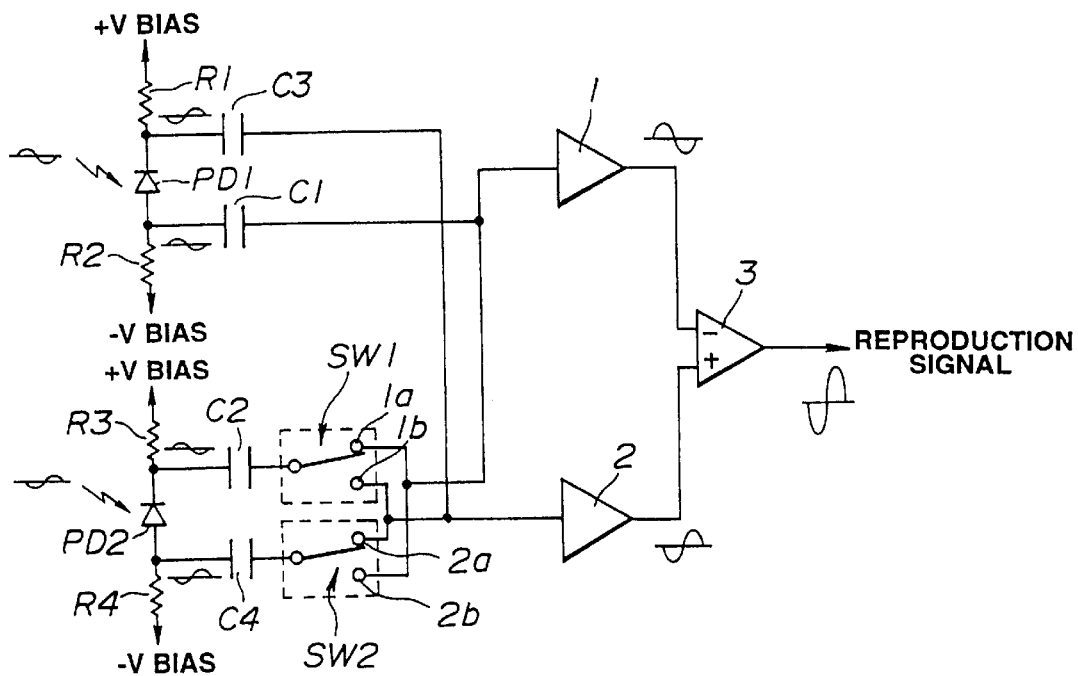
FIGS. 11($a$) and 11($b$) are views showing an example of a circuit in which the configuration for carrying out light signal detection of in-phase/anti-phase is added to the magneto-optical signal detection circuit shown in FIG. 9.

In this case, at the time of reproduction of the magneto-optical signal, as shown in FIG. 11(a), selector switches SW1, SW2 are subjected to switching connection to the selected terminal 1a, 2a sides, whereby a configuration as shown in the FIG. 9 mentioned above is provided.

Namely, at the time of reproduction of the magneto-optical disc, etc., as shown in FIG. 11(a), light signals subjected to intensity modulation which are opposite to each other in phase are incident to two photo-diodes PD1, PD2. As a result, an output current of the anode side of the photo-diode PD1 and an output current of the cathode side of the photo-diode PD2 are caused to be in phase with each other. These output currents are added in terms of current. The current signal thus obtained is converted into a voltage signal by the current/voltage converter 1. The voltage signal thus obtained is sent to the inverting input terminal of the differential amplifier 3. Moreover, an output current of the cathode side of the photo-diode PD1 and an output current of the anode side of the photo-diode PD2 are caused to be in phase with each other. These output currents are added in terms of current. The current signal thus obtained is converted into a voltage signal by the current/voltage converter 2. The voltage signal thus obtained has a phase opposite to that of the voltage signal from the current/voltage converter 1, and is sent to the non-inverting input terminal of the differential amplifier 3.

Accordingly, a signal of amplitude twice greater than those of voltage signals from respective current/voltage converters 1, 2 is taken out from the differential amplifier 3. As a result, the signal level can be doubled, in the state where the level of the noise produced is the same, as compared to the conventional magneto-optical signal detection circuit. Thus, the S/N ratio can be improved twice, i.e., by 6 dB.

Figure 11B:
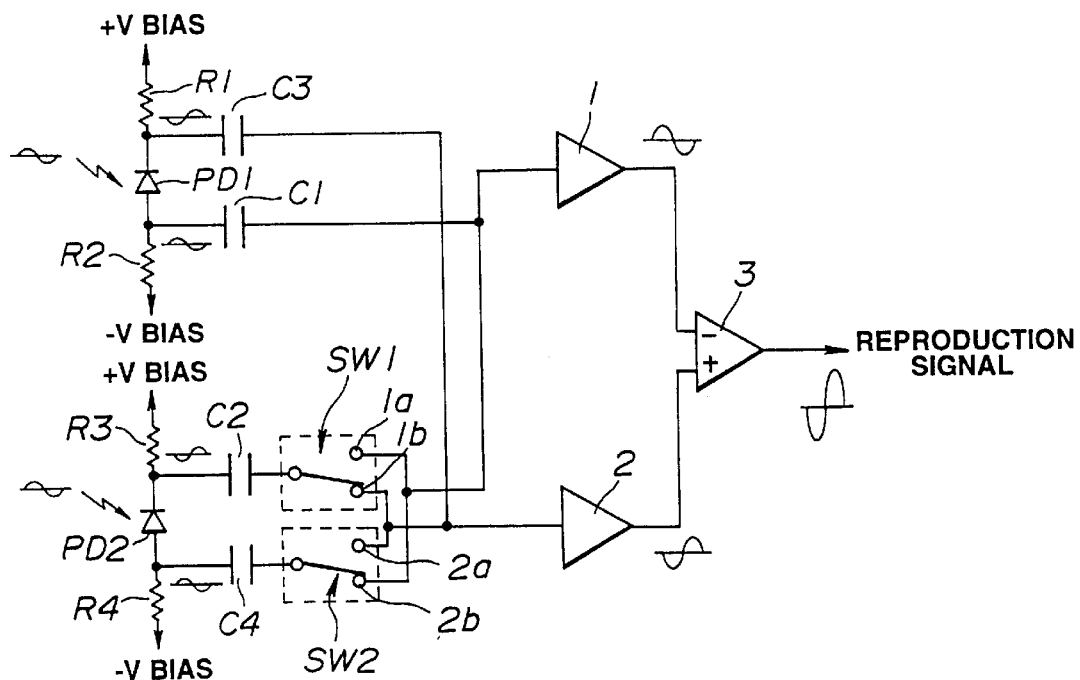

In the case of reproducing the optical disc, etc. on which recording by phase pits or reflection factor change has been made, selector switches SW1, SW2 are subjected to switching connection to the selected terminals 1b, 2b sides as shown in FIG. 11(b). At this time, light signals intensity modulated which are in phase with each other are incident to two photo-diodes PD1, PD2. As a result, an output current of the anode side of the photo-diode PD1 and an output current of the anode side of the photo-diode PD2 are caused to be in phase with each other. These output currents are added in terms of current. The current signal thus obtained is converted into a voltage signal by the current/voltage converter 1, and is sent to the inverting input terminal of the differential amplifier 3. Moreover, an output current of the cathode side of the photo-diode PD1 and an output current of the cathode side of the photo-diode PD2 are caused to be in phase with each other. These output currents are added in terms of current. The current signal thus obtained is converted into a voltage signal by the current/voltage converter 2. The voltage signal thus obtained has a phase opposite to that of the voltage signal from the current/voltage converter 1, and is sent to the non-inverting input terminal of the differential amplifier 3.

Accordingly, it is possible to take out, from the differential amplifier 3, a signal which is four times greater than the voltage signal level from the current/voltage converter 1 of the light signal detection circuit of FIG. 10(b).

As stated above, in accordance with the configuration of FIG. 11, it is possible to easily realize both detection of anti-phase light signal as in the case of reproduction of the magneto-optical disc and detection of in-phase light signal as in the case of reproduction of the disc on which recording has been made by phase pits or reflection factor change by allowing the selector switches SW1, SW2 to undergo switching control in a manner interlocking with each other.

FIG. 12 shows a modification of the light signal detection circuit of FIG. 11, and illustrates the example where respective selected terminals 1b, 2b sides of selector switches SW1, SW2 of FIG. 11 are placed in the state where no component is connected thereto. In this case, simple ON/OFF switches may be used in place of the respective selector switches.

Figure 12A:
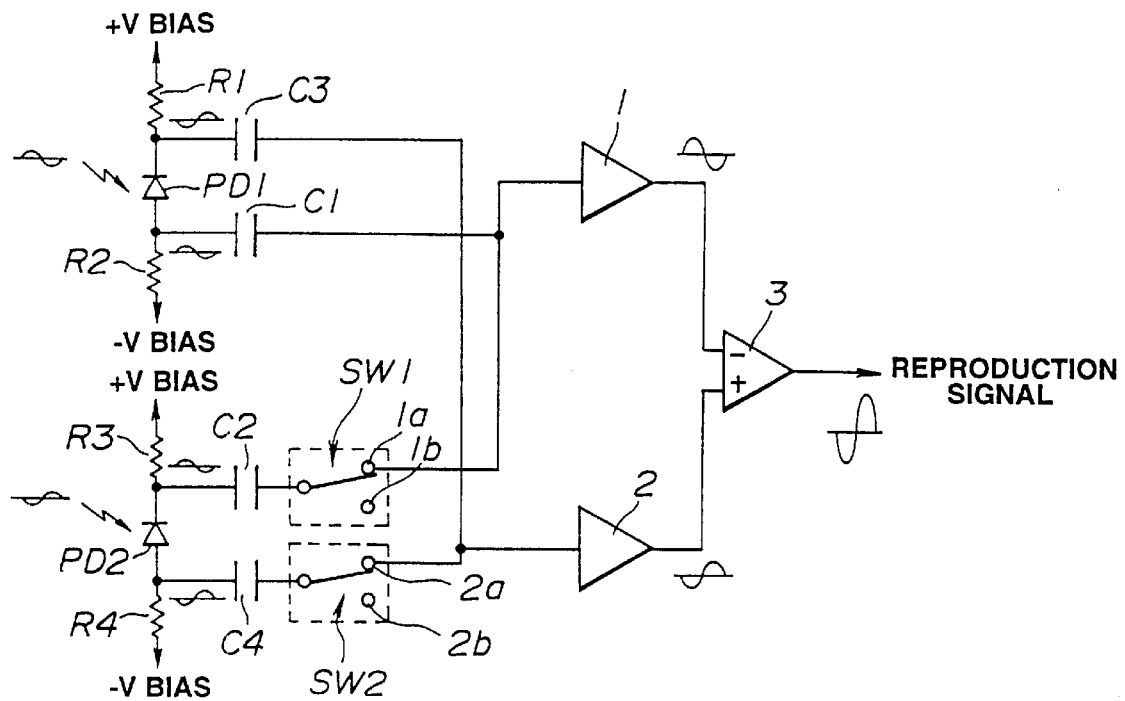
FIGS. 12($a$) and 12($b$) are views showing a modification of the circuit of FIG. 11.

In the example of FIG. 12, at the time of reproduction of the magneto-optical signal, as shown in FIG. 12(a), selector switches SW1, SW2 are caused to respectively undergo switching connection to selected terminals 1a, 2a, whereby a configuration as shown in the FIG. 11(a) mentioned above is provided. Thus, similar effects/advantages can be obtained.

Figure 12B:
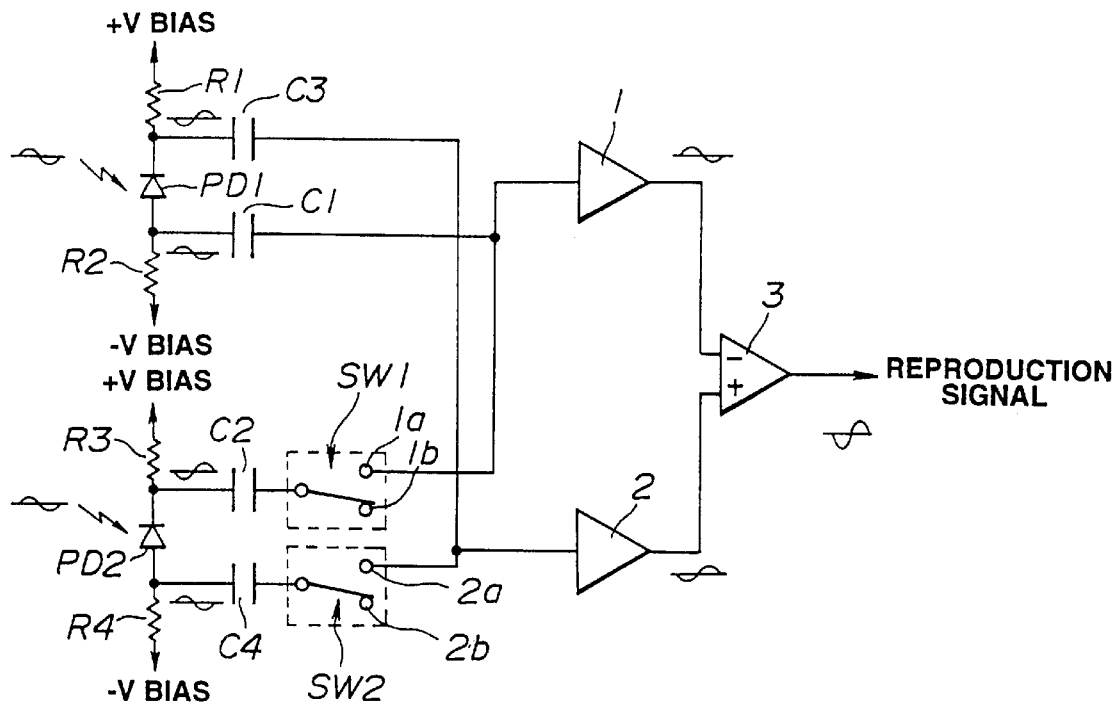

On the contrary, in the case of reproducing the optical disc, etc. on which recording by phase pits or reflection factor change has been made, selector switches SW1, SW2 are subjected to switching connection to selected terminals 1b, 2b side as shown in FIG. 12(b). In this case, no component is connected to these selected terminals 1b, 2b. Therefore, switching state of these selector switches correspond to OFF state of the simple ON/OFF switch. At this time, output currents from the anode/cathode of the photo-diode PD2 are cut off. As a result, only output current from the anode side of the photo-diode PD1 is delivered to the current/voltage converter 1, and only an output current from the cathode side of the photo-diode PD1 is delivered to the current/voltage converter 2. From these current/voltage converters 1, 2, voltage signals which are opposite to each other in phase are outputted. These voltage signals are sent to the differential amplifier 3, at which they are differentially amplified, resulting in a reproduction signal having amplitude twice greater than those of the input signals. The reproduction signal thus obtained is taken out.

By carrying out such switching, cancellation of currents opposite to each other in phase at the current/voltage converter can be avoided. Since only one half of the light receiving element is utilized, the differential amplifier 3 can provide signal having only amplitude which is one half of the amplitude of the reproduction signal obtained from the circuit shown in FIG. 11(b), for example. However, it is possible to provide a circuit capable of carrying out signal reproduction in a manner independent of the kind of the optical disc without carrying out complicated connection.

Several more practical examples of the optical pick-up to which light signal detection circuits as described above are applied will now be described.

Figure 13:
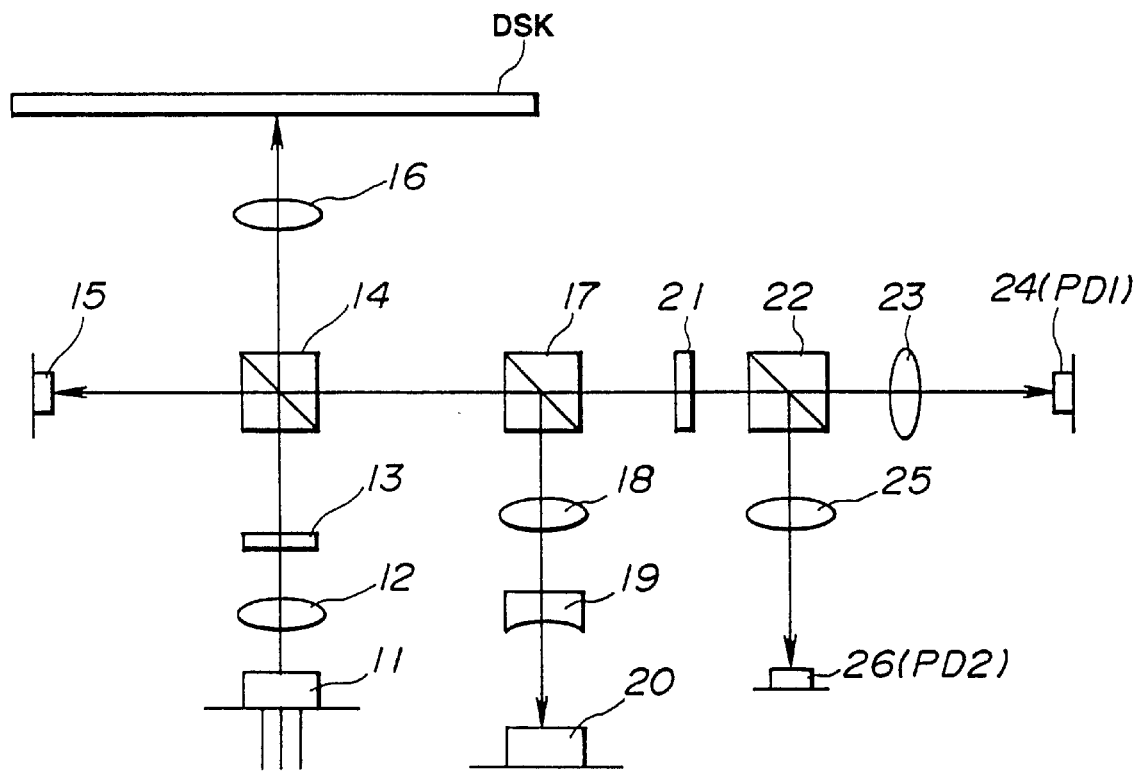
FIG. 13 is a view showing a first more practical example of an optical pick-up to which the light signal detection circuit is applied.

FIG. 13 shows an optical system of the optical pick-up using two independent light receiving elements for detection of magneto-optical signal (corresponding to photo-diodes PD1, PD2 of the above-mentioned embodiment).

The optical pick-up of FIG. 13 optically separates return light to thereby detect a servo signal and a magneto-optical signal by separate or individual light receiving elements to further use polarization beam splitter as a light detection element, and to use two independent light receiving elements as an element for magneto-optical signal detection. Further, a light receiving element for light power monitor is provided. Thus, four light receiving elements in total are used. The optical pick-up is takes the form closest to the principle of the magneto-optical disc reproduction. However, since the configuration is complicated, such an optical pick-up is not frequently used for product. It is to be noted that, in the example of FIG. 13, astigmatism is used for detection of focus servo error signal, and the differential push-pull method is used for detection of tracking servo error signal.

In the optical pick-up of FIG. 13, an emitted light from a laser light emitting element 11 is changed into a parallel light by a collimator lens 12. The parallel light thus obtained is delivered to a grating 13. At the grating 13, an incident light is separated into three beams for the purpose of carrying out tracking error detection by the differential push-pull method.

A portion of these beams is reflected by a beam splitter 14. The reflected light thus obtained is incident to a light receiving element 15 for light power monitor, and is used for light power control of the laser light emitting element 11. On the other hand, a light transmitted through the beam splitter 14 is converged onto the signal surface or the recording surface of magneto-optical disc DSK by an object lens (objective) 16.

A return light obtained as the result of the fact that incident light is reflected on the signal surface of the magneto-optical disc DSK is such that plane of polarization is slightly rotated in positive and negative directions in accordance with information subjected to magnetic recording in the state magnetized into N, S poles on the magneto-optical disc DSK. This return light is changed into a parallel light for a second time by the object lens 16, and is incident to the beam splitter 14. A portion of the return light is reflected by the beam splitter 14 so that the optical path is changed by 90 degrees. The light thus obtained is incident to a beam splitter 17. A portion of the return light incident to the beam splitter 17 is caused to undergo an optical processing such that the optical path is changed by 90 degrees for a second time. The light thus obtained is incident to a light receiving element 20 for detection of servo signal through a converging lens 18 and a cylindrical lens 19. Moreover, a portion of the return light incident to the beam splitter 17 is transmitted therethrough, and is incident to a half wave plate 21, at which plane of polarization is rotated by 45 degrees. The light thus obtained is incident to a polarization beam splitter 22. By this polarization beam splitter 22, polarization plane change of return light is converted into intensity change, and the return light is separated into two beams at the same time. These beams are caused to be respectively rays of convergent light by converging lenses 23, 25, and are then incident to light receiving elements 24, 26 for detection of magneto-optical signal. These light receiving elements 24, 26 respectively correspond to the photo-diodes PD1, PD2.

More practical example of respective light receiving elements 24, 26 and 20 in FIG. 13 will now be described with reference to FIGS. 14 and 15.

The light receiving elements 24, 26 are adapted so that a light spot 29 is irradiated onto a light receiving surface 28 as shown in FIG. 14(a) with respect to each element, and represented by an equivalent circuit as shown in FIG. 14(b). Moreover, the light receiving element 20 has, e.g., a light receiving plane surface pattern as shown in FIG. 15(a), and the equivalent circuit corresponding thereto is as shown in FIG. 15(b). Namely, the light receiving surface at the central portion of the light receiving surface pattern of FIG. 15(a) is divided into four sections so that respective anodes are designated at A to D, and the light receiving surfaces of the both side thereof are respectively bisected so that anodes of one light receiving surface are designated at F, E, anodes of the other light receiving surface are designated at H, G, and cathode is commonly designated at K.

When detection output signals from anodes A to G of divisional light receiving areas are respectively designated at a to g, the focus error signal FE is determined by calculating the following formula by the astigmatism:

$$FE=(a+c)-(b+d)$$

In addition, the tracking error signal TE is determined by calculating the following formula by the differential push-pull method $$TE=((a+d)-(c+d)-k((f-e)+(h-g))$$

where k is constant.

Figure 1:
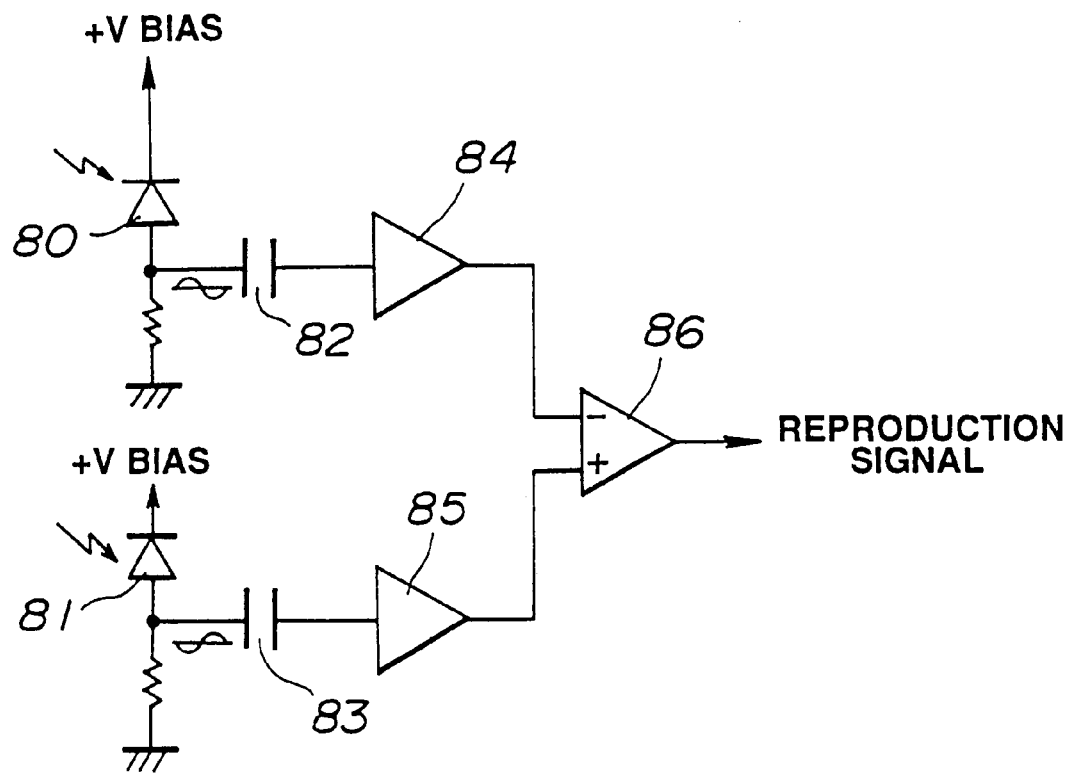
FIG. 1 is a circuit diagram for explaining a conventional magneto-optical signal detection system.
Figure 2:
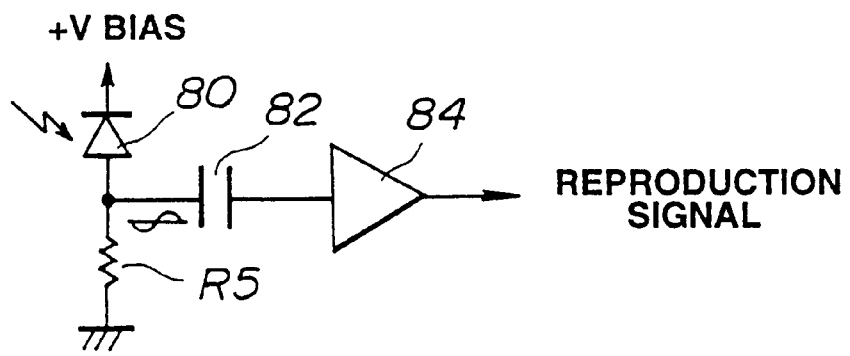
FIG. 2 is a circuit diagram for explaining the single detection system in the magneto-optical signal detection system.
Figure 3:
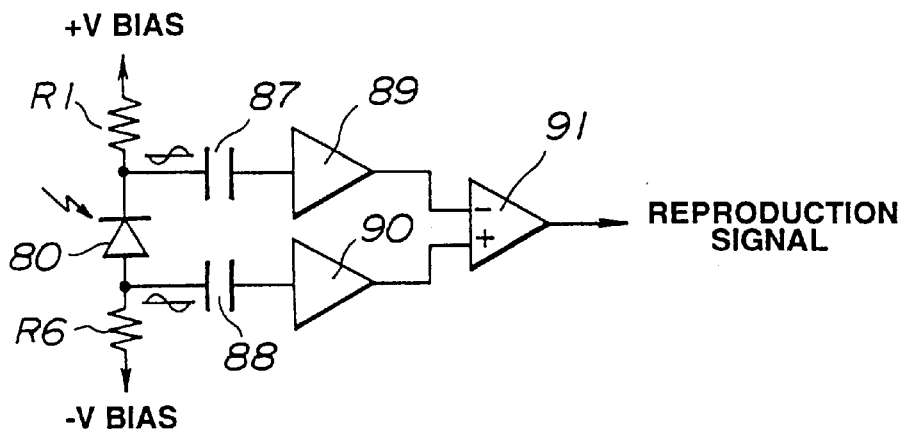
FIG. 3 is a circuit diagram for explaining the differential detection system in the magneto-optical signal detection system.
Figure 5:
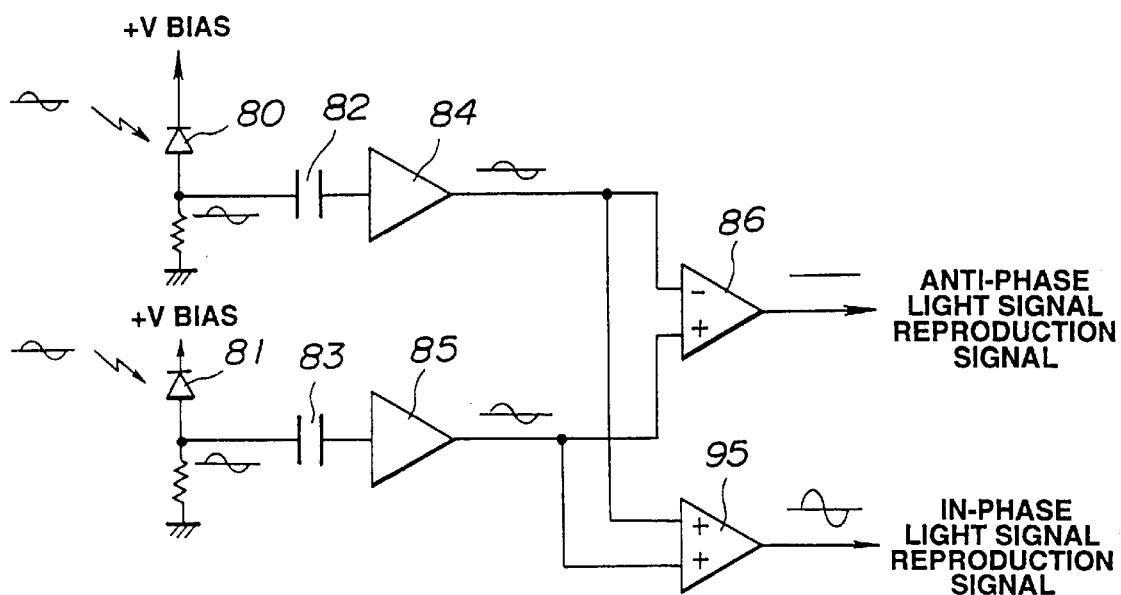
FIG. 5 is a view showing outline of the configuration of a circuit in which in-phase/anti-phase light detection can be carried out in the conventional magneto-optical signal detection system.

Moreover, with respect to light receiving elements 24, 26 for detection of magneto-optical signal, in the configuration shown in FIG. 1 or 5 of the prior art, magneto-optical signal is obtained by determining difference between output signals from respective anodes. On the other hand, in the example of FIG. 6 of the above-described embodiment, an anode output current of light receiving element 24 (corresponding to PD1) and a cathode output current of light receiving element 26 (corresponding to PD2) are added in terms of current to thereby obtain a magneto-optical signal. In addition, magneto-optical signal may be obtained by using the configuration of the example of FIG. 8 or the example of FIG. 9.

Further, in the case of taking out signals recorded by phase pits or reflection factor change, it is sufficient to use a configuration as shown in FIGS. 10, 11 or 12 of the above-described embodiment. It is to be noted that an approach may be employed to all add output signals a to d from respective divisional areas A to D of the light receiving surface of the central portion of FIG. 15(a) showing the light receiving surface pattern of the light receiving element 20 to determine a+b+c+d to thereby reproduce the signal recorded by the phase pits or the reflection factor change.

A more practical example of the optical pick-up using the so-called Wollaston prism will now be described with reference to FIG. 16.

Figure 16:
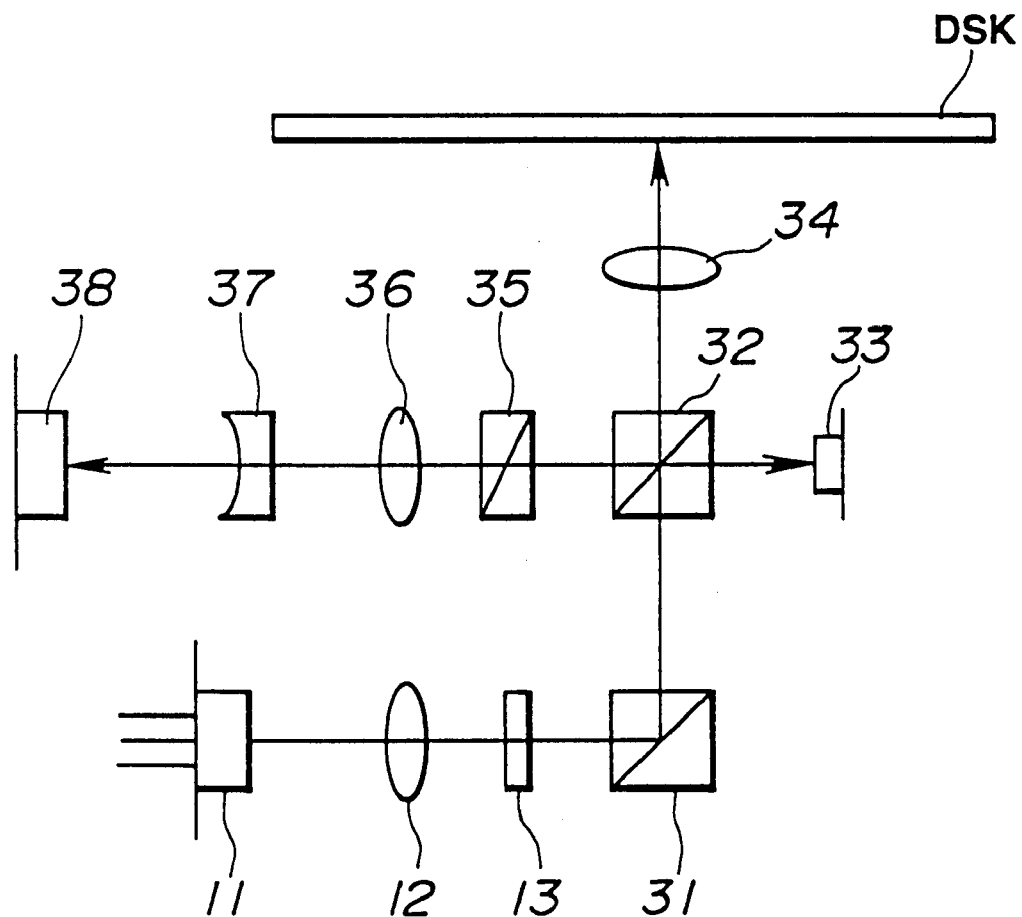
FIG. 16 is a view showing a second more practical example of an optical pick-up to which the light signal detection signal is applied.

In the more practical example of FIG. 16, as a light detection element for converting rotation of plane of polarization of light obtained by the Kerr effect into intensity of light, a three beam Wollaston prism 35 is used. As detection of servo error signal, astigmatism is used for detection of focus error and the differential push-pull method is used for detection of tracking error.

In FIG. 16, an emitted light from laser light emitting element 11 is changed into a parallel light at collimator lens 12. The parallel light thus obtained is delivered to grating 13. At the grating 13, an incident light is separated into three beams for the purpose of carrying out tracking error detection by the differential push-pull method. These beams are reflected by a reflection mirror (or reflection prism) 31 so that the optical path is changed by 90 degrees. The light thus obtained is incident to a beam splitter 32. A portion of the three beams is reflected by the beam splitter 32. A reflected light thus obtained is incident to a light receiving element 33 for light power monitor, and is used for light power control of the laser light emitting element 11. On the other hand, a light transmitted through the beam splitter 32 is converged onto the signal surface or the recording surface of the magneto-optical disc DSK by an object lens (objective) 34.

The plane of polarization of a return light obtained as the result of the fact that incident light is reflected by the signal surface of the magneto-optical disc DSK is rotated in accordance with information subjected to magnetic recording in the state magnetized into N, S poles on the magneto-optical disc DSK. This return light is changed into parallel light for a second time by the object lens 34. The parallel light thus obtained is incident to the beam splitter 32 for a second time. A portion of the return light is reflected by the beam splitter 32 so that the optical path is changed by 90 degrees. A reflected light thus obtained is incident to the so-called Wollaston prism 35. This return light is caused to undergo an optical processing such that change of the rotation direction of the plane of polarization is converted into intensity change by the Wollaston prism 35, and is further separated into three beams. These beams are converted by converging lens 36 and cylindrical lens 37 for detection of focus error by the astigmatism, and is incident to light receiving element 38.

Figure 17A:
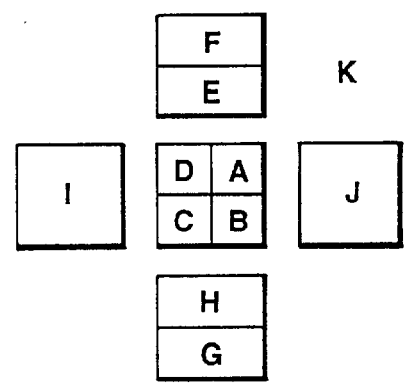
FIGS. 17($a$) and 17($b$) are views showing pattern of conventional light emitting element used in the optical pick-up of FIG. 16 and the equivalent circuit thereof.
Figure 17B:
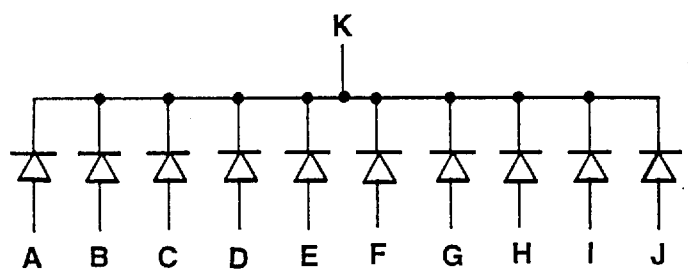
Figure 18A:
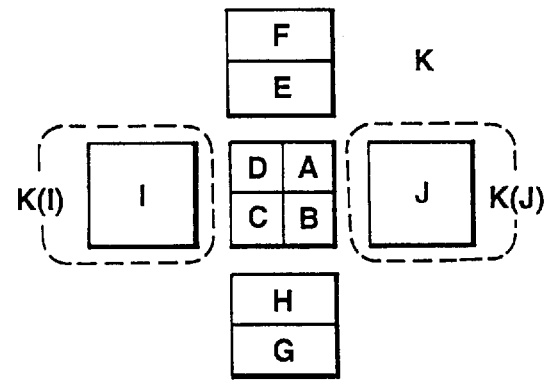
FIGS. 18($a$) and 18($b$) are views showing pattern of light receiving element used in the optical pick-up of FIG. 16 for the purpose of realizing the above-mentioned embodiment and the equivalent circuit thereof.
Figure 18B:
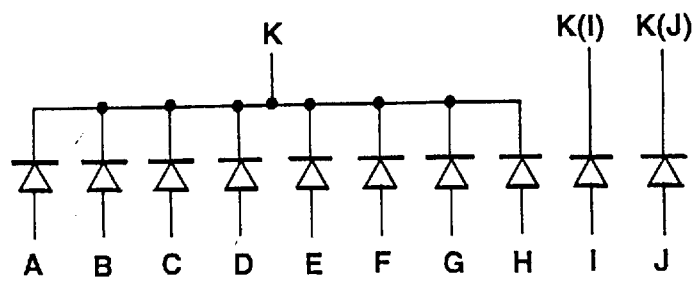

The light receiving surface pattern of the light receiving element 38 is as shown in FIG. 17(*a*) in the case of the light receiving element conventionally used, and is as shown in FIG. 18(*a*) in the case where the light receiving element 38 is used in the above-mentioned embodiment.

Namely, in the light receiving surface pattern of FIG. 17(*a*), anodes A to D serving as light receiving areas divided into four sections are provided at the central portion thereof. Moreover, anodes E, F of bisected light receiving areas are provided in correspondence with preceding beams of three beams divided by the grating 13, and anodes G, H of the bisected light receiving areas are provided in correspondence with succeeding beams. Further, in correspondence with three beams divided by the Wollaston prism, anodes I, J of the light receiving area for detection of magneto-optical signal are provided at left and right positions of the central portion of the light receiving surface pattern. The equivalent circuit of the configuration composed of anodes A to J and common cathode K of these light receiving areas is represented by 10 photo-diodes as shown in FIG. 17(*b*).

On the contrary, in FIG. 18(*a*) showing the light receiving surface pattern for realizing the above-mentioned embodiment, since it is necessary to respectively take out output currents also from respective cathode sides of the light receiving areas I, J for detection of magneto-optical signal, independent cathode areas K(I) and K(J) are respectively provided around these light receiving areas I, J. Accordingly, the equivalent circuit thereof is composed, as shown in FIG. 18(*b*), eight photo-diodes in which the light receiving areas A to H are caused to be respective anodes and cathode K is common, and two photo-diodes in which respective light receiving areas I, J are caused to be anode and respectively independent cathodes K(I), K(J) are provided.

When output signals from anodes A to G of respective divisional light receiving areas of such light receiving surface pattern shown in FIG. 17 or 18 are respectively designated at a to g, the focus error signal FE is determined by calculating the following formula by the astigmatism:

$$FE=(a+c)-(b+d)$$

In addition, the tracking error signal TE is determined by calculating the following formula by the differential push-pull method:

$$TE=((a+d)-(c+d))-k((f-e)+(h-g))$$

where K is constant.

Moreover, with respect to the magneto-optical signal, in the case where the light receiving element of the conventional light receiving surface pattern shown in FIG. 17 is used, when output signals from divisional areas I, J are respectively designated at i, j, the magneto-optical signal can be determined by (i-j). However, in the case where light receiving element of a light receiving surface pattern as shown in FIG. 18 is used, it is sufficient to take out, from the anode of the light receiving area I, anode output current of the light receiving element PD1, e.g., in correspondence with the circuit configuration of FIG. 6 of the above-described embodiment, and to take out, from the cathode K(J) of the light receiving area J, cathode output current of the light receiving element PD2 to add, in terms of current, these output currents to thereby obtain magneto-optical signal. In addition, the configuration of the example of FIG. 8 or the example of FIG. 9 may be used to obtain magneto-optical signal. Further, in the case where signals recorded by phase pits or reflection factor change are taken out, it is sufficient to use a configuration as shown in FIG. 10, 11 or 12 of the above-described embodiment. In this case, it is sufficient to use anode output current of the light receiving area I and output current of cathode K(I) as anode output current and cathode output current from the light receiving element PD1 of FIGS. 8 to 12, and to use anode output current of the light receiving area J and output current of the cathode K(J) as anode output current and cathode output current from the light receiving element PD2 of FIGS. 8 to 12. It is to be noted that taking out of signals recorded by phase pits or reflection factor change may be carried out by all adding output signals a to d from respective divisional areas A to D of the light receiving surface of the central portion of FIG. 18(*a*) to determine a+b+c+d.

A more practical example of an optical pick-up using the so-called microprism detector will now be described with reference to FIG. 19.

Figure 19:
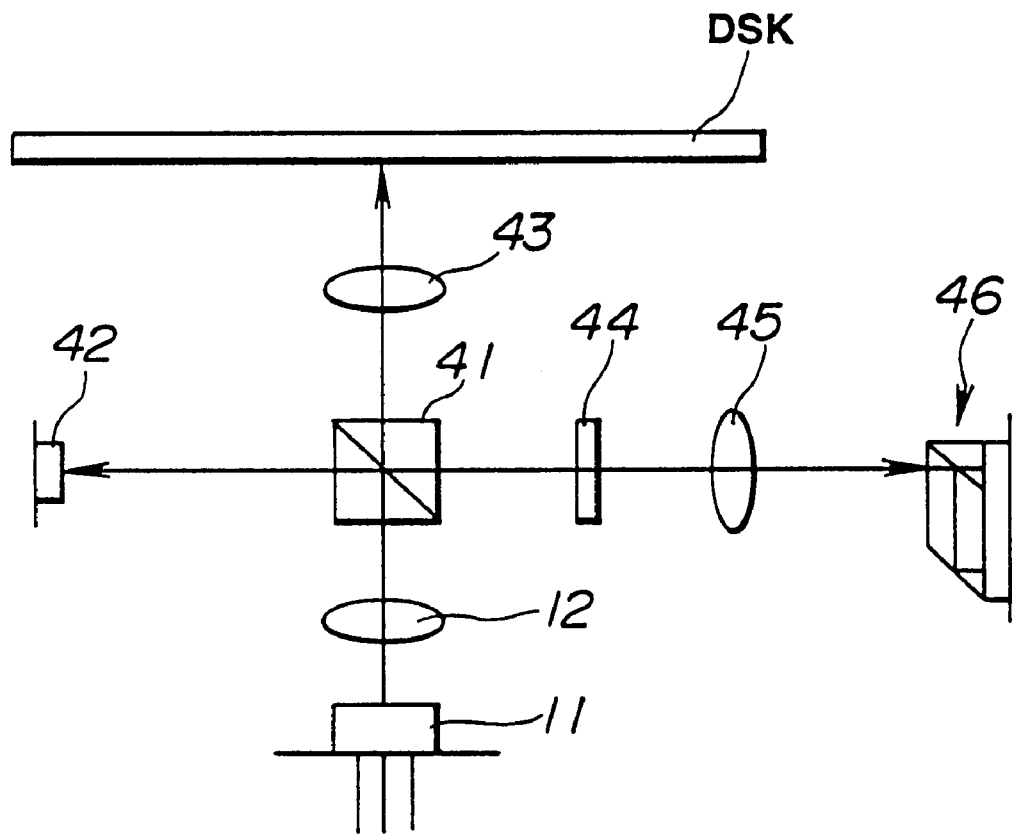
FIG. 19 is a view showing a third more practical example of an optical pick-up to which the magneto-optical signal detection circuit is applied.

In the more practical example of FIG. 19, a microprism detector 46 in which the polarization beam splitter, the mirror and the light detection element are integrated is used. As detection of servo error signal, the differential concentrical method is used for focus error detection, and the push-pull method is used as tracking error detection. Since the differential concentrical method is used for focus error detection differently from the above-described more practical example shown in FIG. 13 or 16, no cylindrical lens is used. Moreover, since the push-pull method is used for detection of the tracking error signal, grating for separating beam into three beams is not used.

In FIG. 19, an emitted light from laser light emitting element 11 is changed into parallel light by collimator lens 12, and is delivered to beam splitter 41. A portion of the delivered light beams is reflected by the beam splitter 41. The reflected light thus obtained is incident to light receiving element 42 for light power monitor, and is used for light power control of the laser light emitting element 11. On the other hand, a light transmitted through the beam splitter 41 is converged onto the signal surface or the recording surface of the magneto-optical disc DSK by object lens 43.

A return light obtained as the result of the fact that incident light is reflected on the signal surface of the magneto-optical disc DSK is changed into parallel light for a second time by object lens 43, and is incident to the beam splitter 41. A portion of the return light is reflected by the beam splitter 41 so that the optical path is changed by 90 degrees. The reflected light thus obtained is incident to half wave plate 21, at which plane of polarization is rotated by 45 degrees. The light thus obtained is caused to be convergent light by converging lens 45, and is then incident to the microprism detector 46.

Figure 20A:
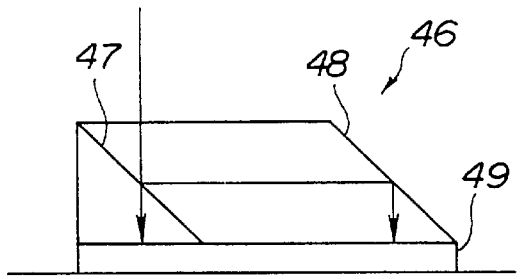
FIGS. 20($a$) and 20($b$) are views showing the structure of optical element 46 and pattern of light receiving element used in the optical pick-up of FIG. 19 and the equivalent circuit thereof.
Figure 20C:
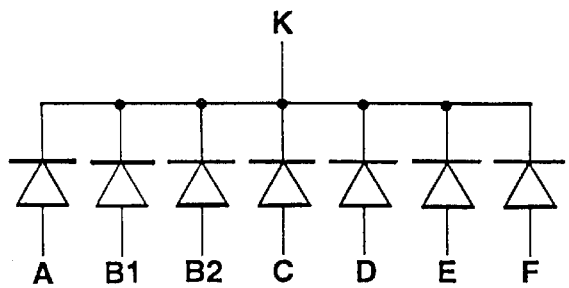

The microprism detector 46 is of a structure in which polarization beam splitter 47, reflection surface 48 and light detection element 49 are integrated as shown in FIG. 20(*a*). The light receiving surface pattern of the light detection element 49 is as shown in FIG. 20(*b*), for example. Namely, a return light from the converging lens 45 of FIG. 19 is incident to the polarization beam splitter 47 of the microprism detector 46, at which change of plane of polarization of the return light is converted into intensity change, and the incident light is separated into two beams at the same time. These two beams are incident to two partial patterns of the light receiving element 49. In this case, in the light receiving surface pattern of FIG. 20(*b*), the two partial patterns both take substantially square shape, and are laterally divided into three laterally elongated light receiving areas. One partial pattern of these two square partial patterns is adapted so that the inside light receiving area is further bisected. Thus, four light receiving areas A, B1, B2, C are formed as anode of the photo-diode of the equivalent circuit of FIG. 20(c). Three light receiving areas D, E, F of the other partial pattern also serve as anode of the photo-diode of the equivalent circuit of FIG. 20(c). Cathodes of these photo-diodes are caused to be common cathode K.

Figure 20B:
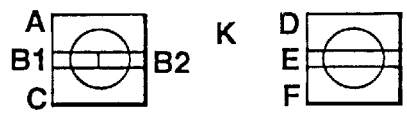
Figure 21A:
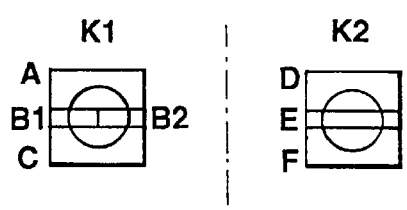
FIGS. 21($a$) and 21($b$) are views showing pattern of light receiving element used in the optical pick-up of FIG. 19 for the purpose of realizing the embodiment and the equivalent circuit thereof.
Figure 21B:
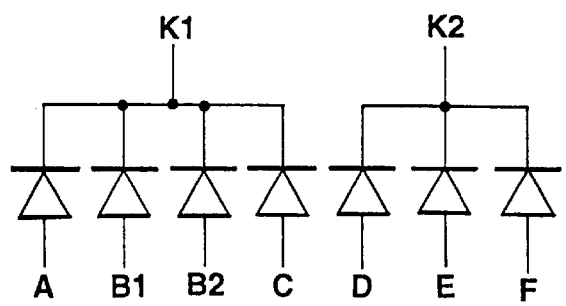

The more practical configuration of FIGS. 20(b), 20(c) with respect to the light detection element 49 of the micro-prism detector shows the prior art. In order to realize an embodiment as described above, a more practical configuration as shown in FIG. 21 is required. Namely, FIG. 21(a) shows the light receiving surface pattern of the light detection element which can be used in the embodiment as explained with reference to FIG. 6 or FIGS. 8 to 12. FIG. 21(b) shows its equivalent circuit. The light receiving surface pattern of FIG. 21(a) and the equivalent circuit of FIG. 21(b) are respectively substantially the same as the light receiving surface pattern of FIG. 20(b) and the equivalent circuit of FIG. 20(c), but differ from the latter in that independent cathodes K1, K2 are provided every two partial patterns. Namely, common cathode K1 of anode areas A, B1, B2, C which are light receiving areas divided into four sections serving as one partial pattern of the light receiving surface pattern of FIG. 21(a) and common cathode K2 of anode areas D, E, F which are trisected light receiving areas of the other partial pattern.

Figure 22:
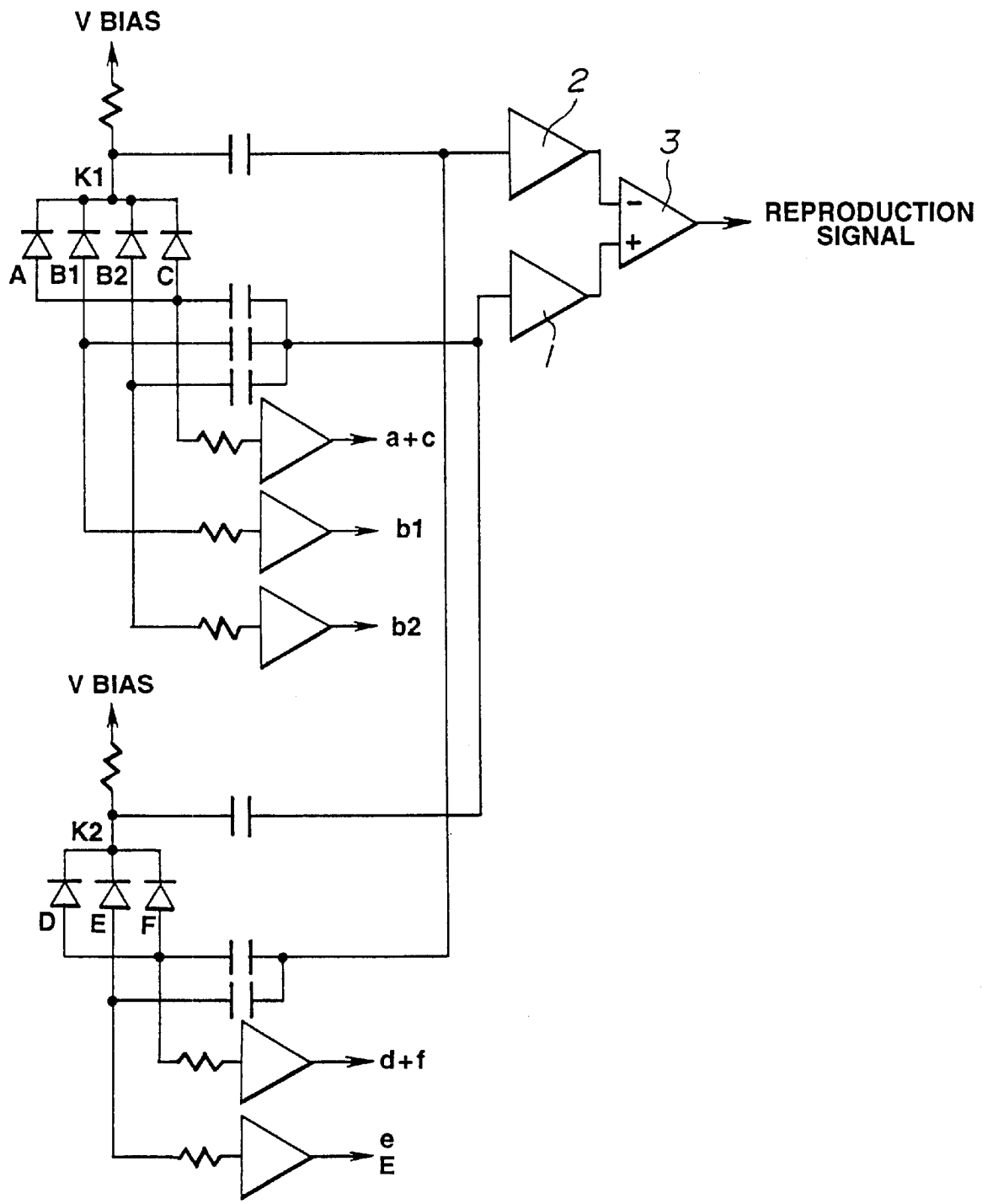
FIG. 22 is a view showing an example of magneto-optical signal detection circuit in the case where the light receiving element of FIG. 21 is used.

The example where a light detecting element as shown in FIG. 21 is used to realize, e.g., circuit configuration shown in FIG. 9 is shown in FIG. 22. As apparent also from FIG. 22, four photo-diodes consisting of anode areas A, B1, B2, C and common cathode K1 correspond to the photo-diode PD1 of FIG. 9, and three photo-diodes consisting of anode areas D, E, F and common cathode K2 correspond to the photo-diode PD2 of FIG. 9.

In this case, when output signals from anodes A to F of these photo-diodes are respectively designated at a to f, the focus error signal FE can be determined by calculating the following formula by the differential concentrical method:

$$FE=(a+(b1+b2)+c)-(d+e+f)$$

The tracking error signal TE can be determined by calculating the following formula by the push-pull method:

$$TE=b1-b2$$

Moreover, while in the case of reproducing signal recorded by phase pits or reflection factor change, it is sufficient to determine added result (a+(b1+b2)+c)+(d+e+f) of all anode output signals, it is a matter of course to use a configuration for carrying out switching as shown in FIGS. 10 to 12.

The system configuration of an optical disc reproducing apparatus constituted by using an optical pick-up as described above, particularly an optical pick-up applied to the circuit configuration of FIGS. 10 to 12 in which compatible reproduction between signal recorded by phase pits, etc. and signal which has been subjected to magneto-optical recording can be made and the operation thereof will now be described with reference to FIGS. 23 to 26.

Figure 23:
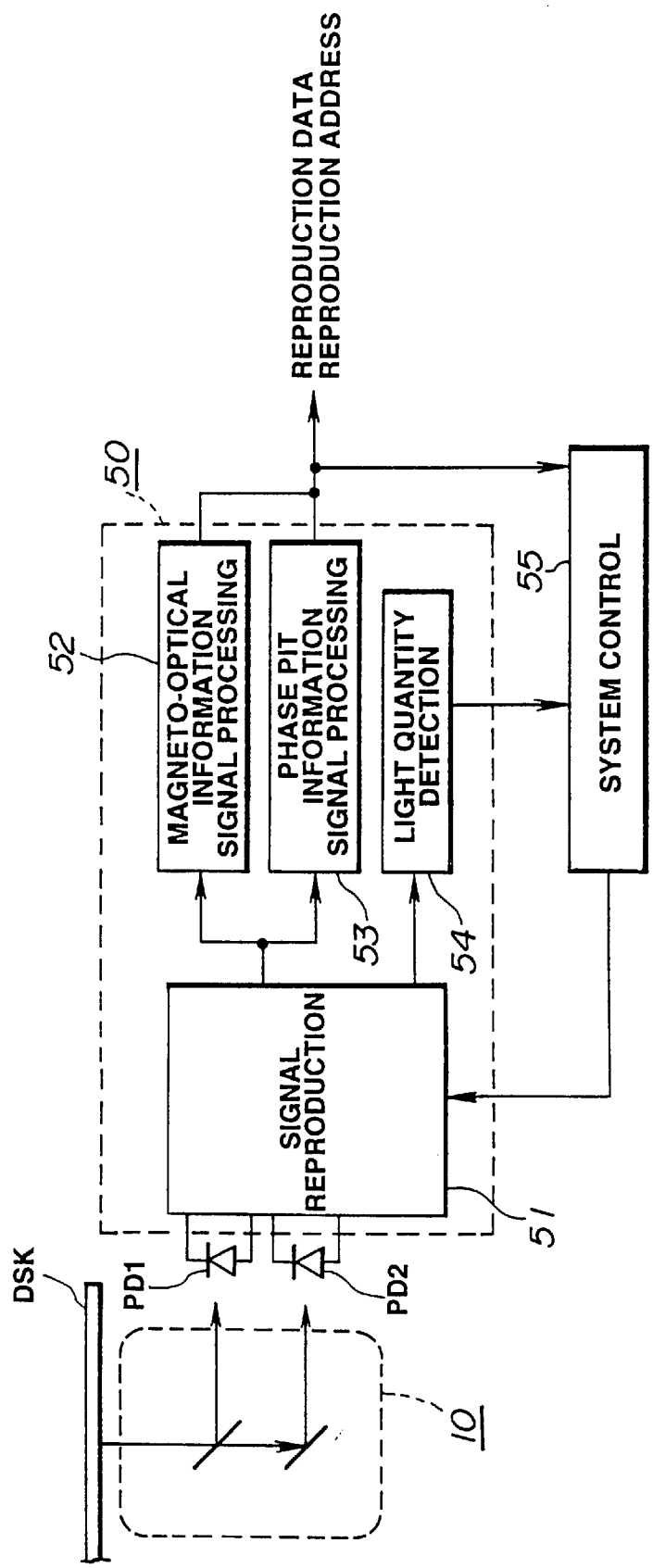
FIG. 23 is a view showing outline of the configuration of an optical disc reproducing apparatus to which the optical pick-up is applied.

In FIG. 23, the optical pick-up is constituted, e.g., by an optical system 10 having a configuration as shown in FIGS. 13, 16, 19 mentioned above and photo-diodes PD1, PD2 which are light detection means for reproduction of magneto-optical signal which has been explained together with these figures and/or the relating light receiving surface pattern, etc.

The optical disc reproducing apparatus shown in FIG. 23 includes optical system 10 and photo-diodes PD1, PD2 constituting the optical pick-up, a signal processing section 50 for implementing signal processing on the basis of an output from the optical pick-up, and a system control section 55 for carrying out switching control of the operation of the signal processing section 50.

The signal processing section 50 includes, as shown in FIG. 23, for example, a signal reproduction section 51, a magneto-optical information signal processing section 52 for implementing signal processing to an output signal from the signal reproducing section 50 to take out magneto-optical information, a phase pit information signal processing section 53 for implementing signal processing to the same signal as the signal delivered to the magneto-optical information signal processing section 52 to take out phase pit information, and a light quantity detecting section 54 for detecting quantity of light received by photo-diodes PD1, PD2 serving as light receiving element.

In the optical system, return light on the optical disc DSK surface of laser beams irradiated onto the optical disc DSK is caused to be incident to photo-diodes PD1, PD2 serving as light receiving element. Rays of light received by the photo-diodes PD1, PD2 are delivered to the signal reproducing section 51 of the signal processing section 50.

The signal reproducing section 51 is operative as in the above-described circuit configuration of FIGS. 10 to 12 to convert a current signal obtained by photoelectric conversion into a voltage signal by the current additive detection system to deliver an output signal to the magneto-optical information signal processing section 52 and the phase pit information signal processing section 53. Moreover, the signal reproducing section 51 delivers an electric signal based an rays of light respectively received by photo-diodes PD1, PD2 to the light quantity detecting section 54.

The light quantity detecting section 54 is required that in the case where reproduction only optical disc recorded by phase pits, etc. is reproduced by the optical disc reproducing apparatus constituted in this way, this reproduction only optical disc must be distinguished from the magneto-optical disc. It is known that the ordinary reproduction only optical disc has reflection factor which is about five times greater than the ordinary magneto-optical disc. The light quantity detecting section 54 grasps, as difference of light quantity, difference between reflection factor of the magneto-optical disc and that of the reproduction only optical disc on which, e.g., phase pits are formed to carry out discrimination of kind of optical disc in dependency upon whether the light quantity difference is higher or lower than the threshold set in advance. This optical disc discrimination signal is delivered from the light quantity detecting section 54 to the system control section 55.

The system control section 55 is adapted so that a selective switching signal for switching selector switch SW of FIG. 10, or selector switches SW1, SW2 of FIG. 11 or 12 in correspondence with the fact that light of in-phase/anti-phase is detected in accordance with the light disc discrimination signal is sent to signal reproducing section 51. Since output timing of this selective switching signal changes depending upon kind of the optical disc, a processing as described later is carried out in the system control section 55. By this selective switching signal, in the optical disc reproducing apparatus, information recorded irrespective of kind of the optical disc is obtained through the magneto-optical information signal processing section 52, and the phase pit information signal processing section 53.

Figure 24:
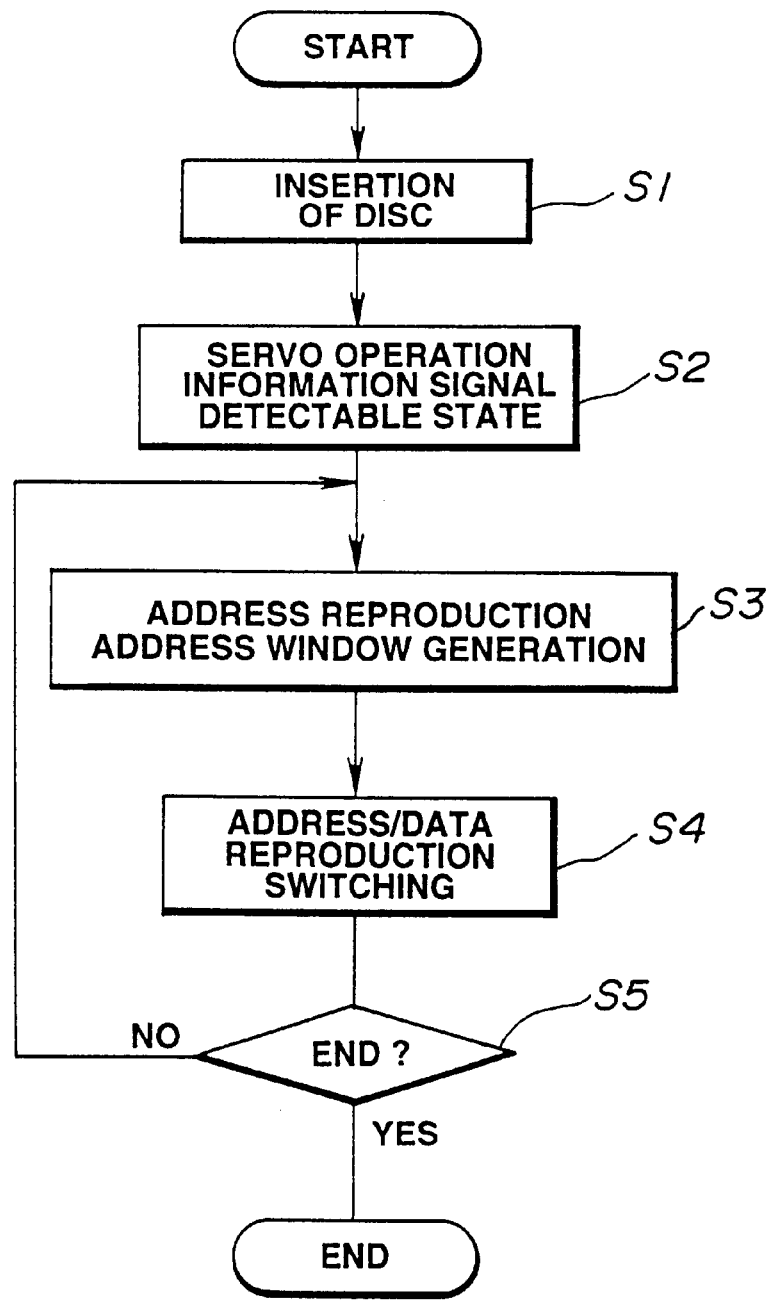
FIG. 24 is a flowchart for explaining the operation procedure of the optical disc reproducing apparatus.
Figure 25:
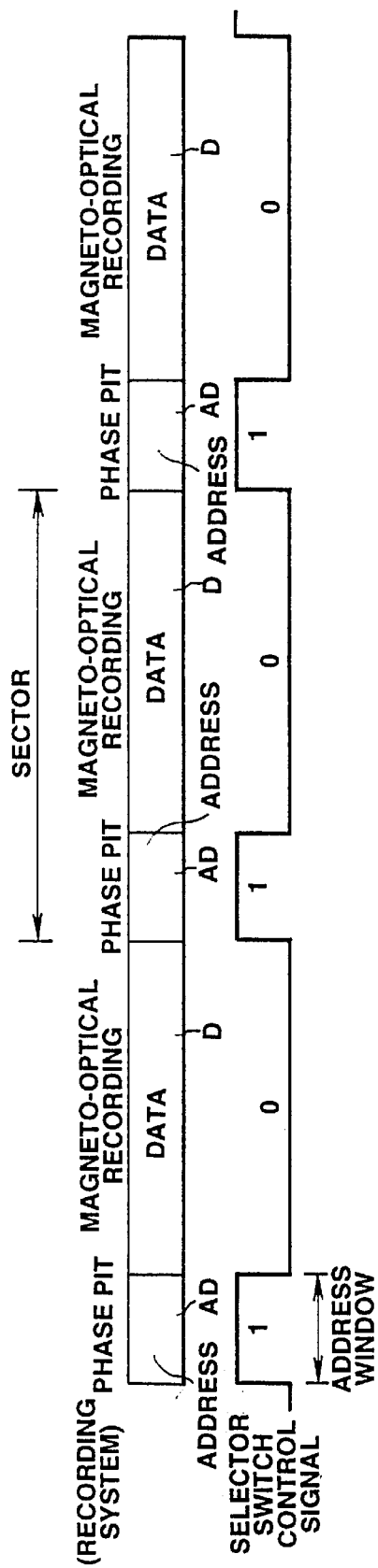
FIG. 25 is a view for explaining a method of generating address window for carrying out light detection of in-phase/anti-phase in the optical disc reproducing apparatus.

The optical disc reproducing apparatus operates in accordance with procedure as shown in FIG. 24, for example, by the system control section 55.

Initially, at step S1, disc which is recording medium is inserted into the optical disc reproducing apparatus.

At the subsequent step S2, the system control section 55 conducts a control to allow the servo circuit to be operative to make a setting such that there results the state where information from the optical disc DSK can be detected. Thus, the processing operation proceeds to step S3.

At the step S3, the reproducing apparatus reproduces address information recorded on the optical disc DSK, and generates address window which will be described later.

At the subsequent step S4, the reproducing apparatus changes selective switching signal in dependency upon whether or not information from the optical disc DSK to be reproduced falls within the address/data area in accordance with address information or generated address window. Thus, the processing operation proceeds to step S5.

At the step S5, the reproducing apparatus judges whether or not signal reproduction from the optical disc DSK is completed. As a result, in the case where signal reproduction is not yet completed (No), the processing operation returns to the step S3 to repeat processing of the previously described steps S3, S4. On the other hand, in the case where signal reproduction is completed (Yes), signal reproduction of the optical disc DSK is completed.

Explanation will now be given in connection with, e.g., generation of address information or address window, etc. as the operation of the system control section 55 corresponding to kind of the optical disk DSK.

Ordinary data recording magneto-optical disc is adapted so that track of one round (one circumference) is divided into plural areas. The unit of the respective divided areas is called sector. At the leading portion of each sector, address indicating sector position on the optical disc is recorded in advance by phase pits. The magneto-optical disc can carry out management/retrieval of data by such sector division/ address assignment.

Meanwhile, in the case of reproducing this magneto-optical disc, it is required to reproduce both information area recorded in advance by phase pits, i.e., address area AD and information area recorded by direction of magnetization, i.e., data area D. As has been explained above, in the magneto-optical disc where recording by phase pit and magneto-optical recording are mixed, in accordance with the conventional current additive detection system, when light signals of in-phase/anti-phase are incident to two photo-diodes, e.g., recording by phase pits could not be detected in principle. In view of the above, the system control section 55 allows selector (changeover) switches SW1, SW2 of the signal reproducing section 51 to undergo switching control in dependency upon disc discrimination signal which has distinguished one of the mixed areas. For this switching control, address window is generated so as to take out only address area AD, for example.

At the step S2 of FIG. 24, when servo is applied so that information can be read, the signal reproducing section 51 is caused to be in the mode where light of in-phase is detected at the step S3 to carry out reproduction of address information. By reproduction of the address information, timings of address area AD and data area D become clear. The system control section 55 generates address window shown in FIG. 25 by using such a relationship. When this timing is used as control signal of selector switch, it becomes possible to carry out switching between light detection modes of in-phase/ anti-phase.

Figure 26:
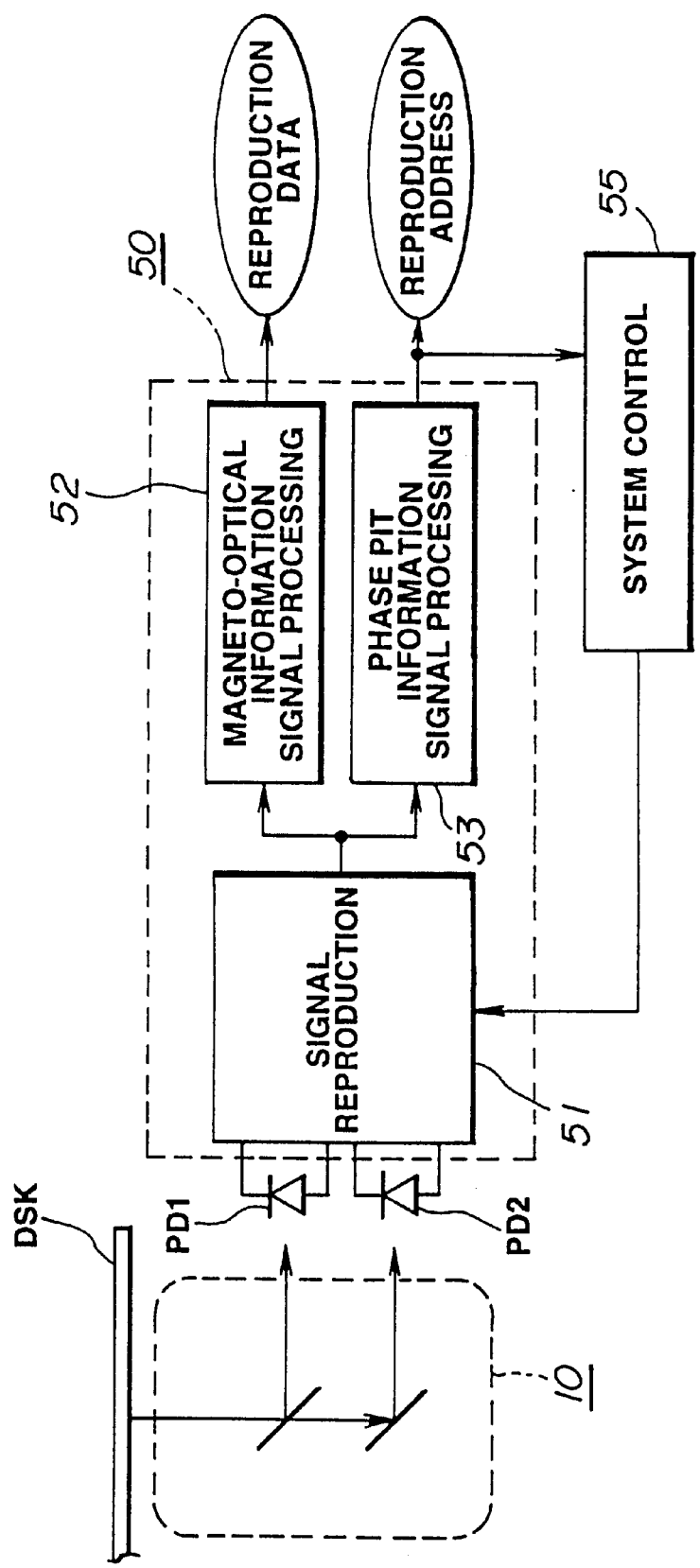
FIG. 26 is a view showing a more simplified circuit configuration of the optical disc reproducing apparatus.

When this method is indicated as (i.e., applied to) more practical configuration, e.g., a circuit configuration as shown in FIG. 26 is provided.

It is seen that the signal processing section 50 can be constituted without providing light quantity detecting section 54. The system control section 55 delivers, to the signal reproducing section 51, a selective switching signal by using address information reproduced from the phase pit information signal processing section 53.

In addition, with respect to kind of the optical disc, since lead-in area where disc discrimination information is described is provided at the innermost circumferential portion of the optical disc, it is possible to recognize the kind of the optical disc from information obtained by reproducing the lead-in area. Accordingly, it is seen that it is desirable that, at the time of insertion of the disc, the optical disc reproducing apparatus carries out read-out operation in the state where the operational mode is set to the mode for detecting in-phase light in the beginning. With this method, with respect to not only the reproduction only optical disc but also the write once type optical disc recorded by, e.g., change of reflection factor, it is possible to carry out discrimination from the magneto-optical disc in correspondence therewith.

Moreover, in recent years, the so-called hybrid discs having reproduction only area where data are recorded in advance by phase pits and recording/reproduction area where recording/reproduction of data is carried out by magneto-optical recording are being put into practical use.

In the so-called hybrid disc as described above, address range of the reproduction only area/address range of recording/reproduction area are described at the lead-in portion. By switching light detection of in-phase/anti-phase on the basis of address information of the lead-in portion, it is possible to precisely reproduce information even with respect to the so-called hybrid disc.

By employing such a configuration, even in the case of the circuit configuration using the current additive detection system, it is possible to carry out reproduction corresponding to two systems while discriminating between the magneto-optical disc and the optical disc on which phase pit recording or recording by reflection factor change has been made.

In accordance with the magneto-optical signal detection circuit which is the embodiment according to this invention as described above, it is possible to reduce the circuit scale while suppressing noise of current/voltage converter. By reduction in noise of the current/voltage converter, S/N ratio of the reproduction signal can be improved. As a result, it is possible to improve, to much degree, error rate in the digital system, for example. Thus, improvements in reliability/ information density/transmission rate (speed) can be made.

Further, by carrying out such an optical path design to decrease quantity of light incident to the light receiving element to enhance the optical path efficiency from the laser light emitting element to the magneto-optical disc surface, it is possible to also hold emission power of laser light emitting element down to low level as well, thus making it possible to elongate the lifetime of the system. By reduction in the circuit scale, reduction of power consumption can be also made.

In addition, compatible reproduction of the optical disc which does not depend upon kind of magneto-optical disc, optical disc for carrying out recording by phase pits or reflection factor change, or the like can be made. Thus, the degree of freedom the format of the optical disc is increased, thus making it possible to further improve added value of the apparatus.

I claim:

1. A light signal detection circuit comprising:

first and second light detecting means for optically detecting a recording recorded on a recording medium;

current/voltage converting means for adding, in terms of current, output signals delivered from the first and second light detecting means to convert it into voltage; and switch means for cutting off an output signal from one of said light detecting means when said output signal is out of phase with the output signal from the other one of said light detecting means such that the output signals from the first and second light detecting means are always in-phase.

2. The light signal detection circuit as set forth in claim 1, wherein said current/voltage converting means comprises first current/voltage converter for converting a current obtained by adding an output current from the anode side of the first light detecting means and an output current from the cathode side of the second light detecting means into voltage, and wherein said switch means comprises a first switch between the cathode side of the second light detecting means and the first current/voltage converter.

3. The light signal detection circuit as set forth in claim 1, wherein said current/voltage converting means further comprises second current/voltage converter for converting a current obtained by adding an output current from the cathode side of the first light detecting means and an output current from the anode side of the second light detecting means into voltage;

wherein said switch means further comprises a second switch disposed between the anode side of the second light detecting means and the second current/voltage converter; and differential amplifying means for carrying out differential amplification between output signals from the second current/voltage converter and the first current/voltage converter.

4. The light signal detection circuit as set forth in claim 1, wherein said first and second light detecting means are photo-diodes.

5. A light signal detection circuit comprising:

first and second light detecting means for optically detecting a recording signal recorded on a recording medium;

first current/voltage converting means for converting a current obtained by adding an output current from the anode side of the first light detecting means and an output current from the second light detecting means into voltage;

second current/voltage converting means for converting a current obtained by adding an output signal from the cathode side of the first light detecting means and an output current from the second light detecting means into voltage;

first switching means for delivering an output signal from the cathode side of the second light detecting means to either one of the first current/voltage converting means and the second current/voltage converting means;

second switching means for delivering an output signal from the anode side of the second light detecting means to either one of the first current/voltage converting means and the second current/voltage converting means; and differential amplifying means for carrying out differential amplification between output signals form the first and second current/voltage converting means, wherein said first and second switching means operate such that the respective output signals from the first and second light detecting means input to the first and second current/voltage converting means are always in-phase.

* * * * *